United States Patent
Kinsho

(10) Patent No.: US 6,495,653 B1
(45) Date of Patent: Dec. 17, 2002

(54) CURABLE COMPOSITION AND CURED ARTICLE THEREOF

(75) Inventor: Toshihiko Kinsho, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/673,374

(22) PCT Filed: Mar. 25, 1999

(86) PCT No.: PCT/JP99/01519

§ 371 (c)(1),
(2), (4) Date: Dec. 8, 2000

(87) PCT Pub. No.: WO99/54373

PCT Pub. Date: Oct. 28, 1999

(30) Foreign Application Priority Data

Apr. 17, 1998 (JP) .......................... 10-124183
Feb. 10, 1999 (JP) .......................... 11-032229

(51) Int. Cl.$^7$ .............................. C08G 75/00
(52) U.S. Cl. ................... 528/73; 528/293; 528/370; 528/377; 528/406; 528/407
(58) Field of Search .................. 528/73, 293, 370, 528/397, 406, 407

(56) References Cited

U.S. PATENT DOCUMENTS 3,313,782 A * 4/1967 Springmann
5,132,458 A * 7/1992 Hongl
5,175,231 A * 12/1992 Rappoport

FOREIGN PATENT DOCUMENTS

EP 943660 * 9/1999
JP 08-302010 * 11/1996
WO 9824849 * 6/1998

* cited by examiner

Primary Examiner—David J. Buttner
(74) Attorney, Agent, or Firm—Connolly Bove Lodge & Hutz LLP

(57) ABSTRACT

It is an object of the present invention to provide a curable composition retaining curability even at a low temperature of −20 to 5° C. and having a low viscosity at such low temperature, the cured product of which is an artifact having excellent water resistance, chemical resistance, mechanical strength and other physical properties. The present invention is directed to a curable composition which comprises a hetero ring-containing compound (A) of the following general formula (1), a compound (B) having 2 or more electrophilic groups reactive with thiol or —S— groups per molecule, and a compound (C) having 2 or more nucleophilic groups per molecule:

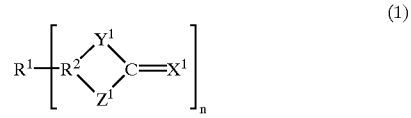

(1)

wherein n represents an integer of 1 to 10; $X^1$, $Y^1$ and $Z^1$ each represents an oxygen or sulfur atom; $R^1$ represents the residue of a cyclic ether group-containing compound (D) or a hydrogen atom; $R^2$ represents a hydrocarbon group of 2 to 10 carbon atoms.

19 Claims, No Drawings

CURABLE COMPOSITION AND CURED ARTICLE THEREOF

TECHNICAL FIELD

The present invention relates to a curable resin composition and a cured product thereof, and more particularly to a curable composition retaining curability even at a low temperature of, for example, −20 to 5° C., having a low viscosity at low temperature, and capable of curing rapidly at room temperature and a cured product thereof.

PRIOR ART

Epoxy resin has excellent mechanical, electrical, adhesion, chemical resistance and other properties and has been used in a variety of industrial applications such as adhesives, paints, linings and so on. As regards the one-component room temperature-curable system, the present inventors previously proposed a one-component epoxy resin composition containing a special heterocyclic compound as the curing agent and capable of moisture-curing at room temperature at a high cure speed and having good storage stability and workability [Japanese Kokai Publication Hei-9-188744]. However, in spite of the practical utility of the one-component epoxy resin composition disclosed in said Japanese Kokai Publication Hei-9-188744, the market demands a more rapidly-curing, more workable one-component room temperature-curable system.

SUMMARY OF THE INVENTION

It is an object of the present invention to provide a curable composition retaining curability even at a low temperature of −20 to 5° C. and having a low viscosity at such low temperature, the cured product of which has excellent water resistance, chemical resistance, mechanical strength and other physical properties. It is a further object of the present invention to provide a one-component curable composition capable of curing rapidly at room temperature and having a low viscosity and good storage stability, the cured product of which has excellent water resistance, chemical resistance, and mechanical and other physical properties. The present inventors did an intensive investigation and arrived at a system conforming to the above objects.

The present invention [1], therefore, is directed to a curable composition
which comprises a hetero ring-containing compound (A) of the following general formula (1), a compound (B) having 2 or more electrophilic groups reactive with thiol or —S— groups per molecule, and a compound (C) having 2 or more nucleophilic groups per molecule:

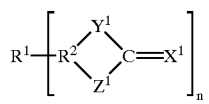

(1)

in the formula (1), n represents an integer of 1 to 10; $X^1$, $Y^1$ and $Z^1$ each represents an oxygen or sulfur atom; $R^1$ represents the residue of a cyclic ether group-containing compound (D) or a hydrogen atom; $R^2$ represents a hydrocarbon group of 2 to 10 carbon atoms.

The present invention [2] is directed to a curing agent for (B) which comprises a reaction product (T1) of said (A) and (C).

The present invention [3] is directed to a cured product as obtainable on curing of said curable composition.

DETAILED DISCLOSURE OF THE INVENTION

[1] Curable composition
[Hetero Ring-containing Compound (A)]

In the present invention [1], the hetero ring-containing compound (A) is represented by the above general formula (1) In the formula, n represents an integer of 1 to 10, preferably 2 to 8; $X^1$, $Y^1$ and $Z^1$ each represents an oxygen or sulfur atom; preferably, $X^1$ is a sulfur atom (S) and one of $Y^1$ and $Z^1$ represents a sulfur atom (S), and the other represents an oxygen atom (O)

$R^2$ represents a hydrocarbon group of 2 to 10 carbon atoms and is a trivalent hydrocarbon group of the formula:

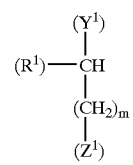

(m is an integer of 1 to 9)
or a tetravalent hydrocarbon group of the formula:

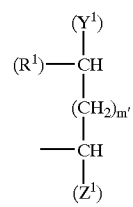

(m' is an integer of 0 to 8). The above-mentioned trivalent hydrocarbon group includes, for example, >CHCH$_2$—, >CHCH$_2$CH$_2$—, >CHCH$_2$CH$_2$CH$_2$— and >CHCH$_2$CH$_2$CH$_2$CH$_2$—, and said tetravalent hydrocarbon group includes, for example, >CHCH<, >CHCH$_2$CH<, >CHCH$_2$CH$_2$CH< and >CHCH$_2$CH$_2$CH$_2$CH<. Preferred is a trivalent hydrocarbon group, and particularly preferred is >CHCH$_2$— or >CHCH$_2$CH$_2$—.

$R^1$ represents a hydrogen atom or the residue of a cyclic ether group-containing compound (D). The above cyclic ether group-containing compound (D) is represented by the general formula (7):

(7)

wherein $R^1$, $R^2$ and n have the same as defined for general formula (1).

Referring to the general formula (7), $R^2$ means a ring-forming residue of a cyclic ether group, other than the oxygen atom. The cyclic ether group is not particularly restricted as far as it contains one oxygen atom as a ring member. The cyclic ether group-containing compound (D) includes, for example, a compound having 1 to 10 cyclic ether groups per molecule.

The cyclic ether group-containing compound (D) includes an epoxy group-containing compound (D1) and an oxetane compound (D2), which are described hereinafter, and preferred is an epoxy group-containing compound (D1).

The epoxy group-containing compound (D) includes a monoepoxide (d11) and a polyepoxide (D11) having 2 or more epoxy groups per molecule. The monoepoxide (d11) corresponds to the general formula (7) wherein n is equal to 1, and the polyepoxide (D11) corresponds to the same formula (7) wherein n is 2 or more.

The monoepoxide (d11) is not particularly restricted as far as it contains one epoxy group per molecule and a suitable species can be judiciously selected according to the intended use or purpose. Thus, it includes, for example, $C_{2-24}$ hydrocarbon oxides (ethylene oxide, propylene oxide, 1-butene oxide, 2-butene oxide, $C_{5-24}$ α-olefin oxides, styrene oxide, etc.), $C_{3-10}$ hydrocarbon glycidyl ethers (n-butyl glycidyl ether, allyl glycidyl ether, 2-ethylhexyl glycidyl ethyl, 2-methyloctyl glycidyl ether, phenyl glycidyl ether, cresyl glycidyl ether, p-sec-butylphenyl glycidyl ether, p-tert-butylphenyl glycidyl ether, etc.), $C_{3-30}$ monocarboxylic acid glycidyl esters (glycidyl acrylate, glycidyl methacrylate, etc.), epihalohydrins such as epichlorohydrin, epibromohydrin, etc.; and hydroxyl group-containing oxides such as glycidol. Preferred are $C_{2-24}$ hydrocarbon oxides and $C_{3-10}$ hydrocarbon glycidyl ethers.

The polyepoxide (D11) is not particularly restricted as far as it contains 2 or more epoxy groups per molecule and a suitable species can be judiciously selected according to the intended use or purpose. Preferred are compounds containing 2 to 6 epoxy groups. The epoxy equivalent (molecular weight per epoxy group) of the polyepoxide (D11) is usually 65 to 1000, preferably 90 to 500. When the epoxy equivalent is not more than 1000, the crosslinked structure is not loose and the physical properties, e.g. water resistance, chemical resistance and mechanical strength, of the cured product are satisfactory. When the epoxy equivalent is not less than 65, the crosslinked structure has good water resistance, chemical resistance and mechanical strength of the cured product.

The polyepoxide (D11) includes the following (D11-1) to (D11-5).

(D11-1) The Glycidyl Ether Type
(i) Diglycidyl Ethers of Dihydric Phenols

Diglycidyl ethers of dihydric phenols containing 6~30 carbon atoms, such as bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl ether, tetrachlorobisphenol A diglycidyl ether, catechin diglycidyl ether, resorcinol diglycidyl ether, hydroquinone diglycidyl ether, 1,5-dihydroxynaphthalene diglycidyl ether, dihydroxy-biphenyl diglycidyl ether, octachloro-4,4'-dihydroxy-biphenyl diglycidyl ether, tetramethyl-biphenyl diglycidyl ether, 9,9'-bis(4-hydroxyphenyl)fluorene diglycidyl ether, and the diglycidyl ether as the reaction product of 2 moles of bisphenol A and 3 moles of epichlorohydrin, among others;

(ii) Polyglycidyl Ethers of 3~6 or Higher Functional Polyhydric Phenols

Polyglycidyl ethers of 3~6 or higher functional polyhydric phenols each containing 6 to 50 or more carbon atoms and a molecular weight of 250 to 3000, such as pyrrogallol triglycidyl ether, dihydroxynaphthylcresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolyl bisphenol A glycidyl ether, trismethyl-tert-butyl-butylhydroxymethane triglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene) tetraglycidyl ether, phenol- or cresol-novolac resin (mol. wt.=400 to 5000) glycidyl ether, limonenephenol-novolac resin (mol. wt.=400 to 5000) glycidyl ether, polyglycidyl ethers of polyphenols (mol. wt.=400 to 5000) obtainable by the condensation reaction of phenol with glyoxal, glutaraldehyde or formaldehyde, and polyglycidyl ethers of polyphenols (mol. wt.=400 to 5000) obtainable by the concentration reaction of resorcin with acetone, among others.

(iii) Diglycidyl Ethers of Aliphatic Dihydric Alcohols

Diglycidyl ethers of diols containing 2 to 100 carbon atoms and a molecular weight of 150 to 5000, such as ethylene glycol diglycidyl ether, propylene glycol diglycidyl ether, tetramethylene glycol diglycidyl ether, 1,6-hexanediol diglycidyl ether, poly(ethylene glycol) (mol. wt.=150 to 4000) diglycidyl ether, poly(propylene glycol) (mol. wt.= 180 to 5000) diglycidyl ether, poly(tetramethylene glycol) (mol. wt.=200 to 5000) diglycidyl ether, neopentyl glycol diglycidyl ether, bisphenol A-alkylene oxide [ethylene oxide or propylene oxide (1 to 20 moles)] adduct diglycidyl ether, etc.;

(vi) Polyglycidyl Ethers of 3~6-hydric or Higher Functional Aliphatic Alcohols

Glycidyl ethers of 3~6 or higher functional polyhydric alcohols containing 3 to 50 carbon atoms and a molecular weight of 92 to 10000, such as trimethylolpropane triglycidyl ether, glycerin triglycidyl ether, pentaerythritol tetraglycidyl ether, sorbitol hexaglycidyl ether, poly(n=2~5) glycerol polyglycidyl ether, etc.

(D11-2) The Glycidyl Ester Type

Glycidyl esters of aromatic polycarboxylic acids containing 6~20 or more carbon atoms and 2~6 or more functional groups and glycidyl esters of aliphatic or alicyclic polycarboxylic acids containing 6~20 or more carbon atoms and 2~6 or more functional groups can be mentioned.

(I) Glycidyl esters of aromatic polycarboxylic acids, e.g. phthalic acids, include diglycidyl phthalate, diglycidyl isophthalate, diglycidyl terephthalate, triglycidyl trimellitate, etc.;

(II) Glycidyl esters of aliphatic or alicyclic polycarboxylic acids include nuclear-hydrogenation products of said glycidyl esters of phenol (aromatic) compounds, dimer acid diglycidyl esters, diglycidyl oxalate, diglycidyl malate, diglycidyl succinate, diglycidyl glutarate, diglycidyl adipate, diglycidyl pimelate, glycidyl (meth)acrylate (co) polymer (degree of polymerization=e.g. 2 to 10), triglycidyl tricarballylate, etc.

(D11-3) The Glycidylamine Type

Glycidylamines derived from aromatic amines containing 6~20 or more carbon atoms and 2~10 or more active hydrogen atoms, and glycidylamines derived from aliphatic, alicyclic or heterocyclic amines can be mentioned.

The aromatic amine-derived glycidylamines include N,N-diglycidylaniline, N,N-diglycidyltoluidine, N,N,N',N'-tetraglycidyldiaminodiphenylmethane, N,N,N',N'-tetraglycidyldiaminodiphenyl sulfone, N,N,N',N'-tetraglycidyldiethyldiphenylmethane, and N,N, O-triglycidyldiaminophenol, among others.

The aliphatic amine-derived glycidylamines include N,N, N',N'-tetraglycidylxylylenediamine and N,N,N',N'-tetraglycidylhexamethylenediamine, among others.

The alicyclic amine-derived glycidylamines include hydrogenated N,N,N',N'-tetraglycidylxylylenediamine, for instance.

The glycidylamines derived from heterocyclic amines include trisglycidylmelamine, among others.

(D11-4) Chain Aliphatic Epoxides

Chain aliphatic epoxides containing 6~50 or more carbon atoms and 2~6 or more functional groups, such as epoxidized polybutadiene (mol wt.=90 to 2,500) having an epoxy equivalent of 130 to 1,000, and epoxidized soybean oil (mol. wt.=130 to 2,500), among others, can be mentioned.

(D11-5) Alicyclic Epoxides

Alicyclic epoxides containing 6~50 or more carbon atoms and 1~4 or more epoxy groups and a molecular weight of 90 to 2500, such as vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl 3',4'-epoxy-6'-methylcyclohexanecarboxylate, bis(3,4-epoxy-6-methylcyclohexylmethyl)adipate, bis(3,4-epoxy-6-methylcyclohexylmethyl)butylamine, etc. can be mentioned. The nuclear hydrogenation products of epoxy compounds derived from said phenols are also included.

Aside from said (D11-1) to (D11-5), other epoxy resins having glycidyl groups reactive with active hydrogen can also be used. Moreover, these polyepoxides (D11) can be used in a combination of two or more types. Preferred, among them, are the glycidyl ether type (D11-1) and the glycidyl ester type (D11-2), and particularly preferred is the glycidyl ether type (D11-1). Among the (D11-1) type compounds, preferred are the diglycidyl ethers of dihydric phenols or aliphatic dihydric alcohols.

The oxetane compound (D2) includes aliphatic oxetane compounds containing 6 to 20 carbon atoms (e.g. 3-ethyl-3-hydroxymethyloxetane), aromatic oxetane compounds containing 7 to 30 carbon atoms (e.g. benzyloxetane, xylylenebisoxetane, etc.), aliphatic carboxylic acid-derived oxetane compounds containing 6 to 30 carbon atoms (e.g. bisoxetane adipate), aromatic carboxylic acid-derived oxetane compounds containing 8 to 30 carbon atoms (e.g. bisoxetane terephthalate), alicyclic carboxylic acid-derived oxetane compounds containing 8 to 30 carbon atoms (e.g. bisoxetane cyclohexanedicarboxylate), aromatic isocyanate-derived oxetane compounds [oxetane, MDI bisoxetane, etc. to be described hereinafter for (B2)], sulfur-type oxetane compounds containing 2 to 20 carbon atoms [e.g. thiirane, 2-methylthiirane, 2,2-dimethylthiirane, 2-hexylthiirane, 2-phenylthiirane, etc.], among others.

The hetero ring-containing compound (A1) derived from an epoxy-containing compound (D1) for cyclic ether group-containing compound (D) can be represented by the following general formula (2) or (3).

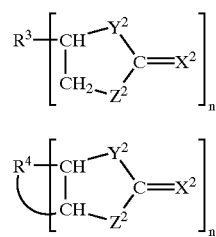

wherein n represents an integer of 1 to 10; $X^2$, $Y^2$, and $Z^2$ each represents a sulfur or oxygen atom; preferably $X^2$ is a sulfur atom and one of $Y^2$ and $Z^2$ is a sulfur atom, with the other being an oxygen atom, more preferably $X^2$ and $Z^2$ each is a sulfur atom and $Y^2$ is an oxygen atom; $R^3$ represents the residue of a polyepoxide (B1) ormonoepoxide (d11); $R^4$ represents the residue of (D11-5); said polyepoxide (B1) is a polyepoxide (D11) other than the alicyclic epoxide (D11-5).

The method of producing the hetero ring-containing compound (A) as a component of the composition of the present invention is not particularly restricted but includes, for example, the compound (A) can be obtained by reacting said cyclic ether group-containing compound (D) with 0.5 to 10 equivalents, based on the cyclic ether group, of carbon disulfide, carbon dioxide or carbonyl sulfide, preferably carbon disulfide, in the presence of a catalyst in a solvent.

The method of producing said hetero ring-containing compound (A1)comprises using said epoxy group-containing compound (D1) for the cyclic ether group-containing compound (D).

The solvent is not particularly restricted as far as it does not interfere with the reaction and is capable of dissolving both the starting compound and the product compound, but generally an aprotic solvent is employed. For example, ethers (e.g. tetrahydrofuran, dioxane, diethylcellosolve, dioxolane, trioxane, dibutylcellosolve, diethyl carbitol, dibutyl carbitol, etc.), ketones (e.g. acetone, methyl ethyl ketone, methyl isobutyl ketone, diethyl ketone, etc.), esters (e.g. methyl acetate, ethyl acetate, n-butyl acetate, etc.), and other polar solvents (e.g. acetonitrile, dimethylformamide, N-methylpyrrolidone, dimethyl sulfoxide, etc.) can be mentioned. Preferred are tetrahydrofuran, acetone and ethyl acetate.

As the catalyst, an alkali or alkaline earth metal halide is used. For example, lithium chloride, lithium bromide, lithium iodide, potassium chloride, calcium bromide, etc. can be used. Preferred is lithium bromide. The amount of the catalyst, based on the cyclic ether group of (D), is 0.001 to 1.0 equivalent. Preferred is 0.01 to 0.1 equivalent.

The reaction temperature is generally 0 to 100° C., preferably 20 to 70° C.

The weight average molecular weight of the hetero ring-containing compound (A) is 120 to 12,000, preferably 200 to 8,000. The hetero-ring equivalent is generally 120 to 1,200, preferably 200 to 800. The viscosity of the hetero ring-containing compound (A) at 25° C. is generally not more than 20,000 mPa·s, preferably not more than 10,000 mPa·s, more preferably not more than 5,000 mPa·s, still more preferably not more than 1,000 mPa·s.

The specific examples of hetero ring-containing compound (A) which can be obtained in the above manner are listed in Table 1.

TABLE 1

| No. | $R_1$ | $R_2$ | $X_1$ | $Y_1$ | $Z_1$ |
|---|---|---|---|---|---|
| 1 | Methyl | >CHCH$_2$— | S | O | S |
| 2 | The residue of trimethylolpropane triglycidyl ether after elimination of epoxy groups | >CHCH$_2$— | S | O | S |
| 3 | Hydrogen | >CHCH$_2$CH$_2$— | S | O | S |
| 4 | The residue of glycidyl methacrylate after elimination of the epoxy group | >CHCH$_2$— | S | O | S |

TABLE 1-continued

| No. | R₁ | R₂ | X₁ | Y₁ | Z₁ |
|---|---|---|---|---|---|
| 5 | The residue of n-butyl glycidyl ether after elimination of the epoxy group | >CHCH₂— | S | O | S |
| 6 | The residue of 2-ethylhexyl glycidyl ether after elimination of the epoxy group | >CHCH₂— | S | O | S |
| 7 | The residue of bisphenol A diglycidyl ether (epoxy equivalent 190) after elimination of epoxy groups | >CHCH₂— | S | O | S |
| 8 | The residue of diglycidyl phthalate after elimination of epoxy groups | >CHCH₂— | S | O | S |
| 9 | The residue of bisoxetane adipate after elimination of oxetane groups | >CHCH₂CH₂— | S | O | S |
| 10 | The residue of 2-ethylhexyl glycidyl ether after elimination of the epoxy group | >CHCH₂— | O | O | S |
| 11 | The residue of 2-ethylhexyl glycidyl ether after elimination of the epoxy group | >CHCH₂— | O | S | S |
| 12 | The residue of 2-ethylhexyl glycidyl ether after elimination of the epoxy group | >CHCH₂— | S | O | O |
| 13 | Methyl | >CHCH₂CH₂CH₂CH₂CH₂— | S | O | S |

[The Compound (B) which has 2 or More Electrophilic Groups Reactive with Thiol or —S⁻ Groups]

Referring to the compound (B) having 2 or more electrophilic groups reactive with thiol or —S⁻ groups, the electrophilic group is at least one member selected from the group consisting of epoxy, isocyanato, acid anhydride, acid halide, oxazoline, cyclic carbonate, unsaturated carboxylic acid and allyl groups. The compound (B) is at least one member selected from the group consisting of polyepoxide (B1), polyisocyanate (B2), poly(acid anhydride) (B3), poly (acid halide) (B4), polyoxazoline (B5), poly(cyclic carbonate) (B6), poly(unsaturated carboxylic acid ester) (B7) and polyallyl compound (B8), and preferred is the polyepoxide (B1).

The polyepoxide (B1) includes the same compounds as said polyepoxide (D11) and may typically be at least one member selected from the group consisting of glycidyl ether (D11-1), glycidyl ester (D11-2), glycidylamine (D11-3), chain aliphatic epoxide (D11-4) and alicyclic epoxide (D11-5).

The compounds (B2) to (B8) specifically include the following compounds.

The polyisocyanate (B2): aromatic polyisocyanates containing 6 to 20 carbon atoms (exclusive of NCO carbon) and 2 or more functional groups and the corresponding crude products [2,4- and 2,6-tolylene diisocyanate (TDI), crude TDI, 2,4'- and 4,4'-diphenylmethane diisocyanate (MDI), crude MDI, polyaryl polyisocyanate (PAPI), etc.]; aliphatic polyisocyanates containing 2 to 18 carbon atoms and 2 or more functional groups [hexamethylene diisocyanate (HDI), lysine isocyanate, etc.]; alicyclic polyisocyanates containing 4 to 15 carbon atoms and 2 or more functional groups [isophorone diisocyanate (IPDI), dicyclohexyl diisocyanate, etc.]; aromatoaliphatic polyisocyanates containing 8 to 15 carbon atoms and 2 or more functional groups [e.g. xylylene diisocyanate]; the corresponding modified polyisocyanates [urethane, carbodiimide, allophanate, urea, biuret, urethodione, isocyanurate or oxazolidone group-containing modification products etc.], and combinations of two or more of such isocyanate compounds. Preferred, among these, are TDI, 4,4'-MDI, IPDI and HDI.

The poly(acid anhydride) (B3): alicyclic acid anhydrides derived from compounds containing 8 to 18 carbon atoms and 2 to 4 carboxyl groups, such as methylcyclohexenedicarboxylic anhydride; aromatic acid anhydrides derived from compounds containing 6 to 30 carbon atoms and 2 to 6 functional groups, such as pyromellitic anhydride, benzophenonetetracarboxylic anhydride, ethylene glycol bistrimellitate, glycerin trimellitate, etc. Preferred, among these, are alicyclic acid anhydrides derived from compounds containing 8 to 18 carbon atoms and 2 to 4 carboxyl groups.

Poly(acid halide) (B4): halides of polycarboxylic acids containing 8 to 100 carbon atoms and 2~6 or more functional groups, such as the halides (chlorides, bromides, iodides, etc.) of phthalic acid, tetrahydrophthalic acid, hexahydrophthalic acid, methyltetrahydrophthalic acid, methylhexahydrophthalic acid, methylnadic acid, dodecylsuccinic acid, trimellitic acid, polyazelaic acid, (degree of polymerization=2 to 10), etc. Preferred, among these, is a halide (especially chloride) of phthalic acid or tetrahydrophthalic acid.

Polyoxazoline (B5): the reaction product of an N-hydroxyalkyl($C_{1-30}$)-oxazolidine with a polyisocyanate (B2) and the ester of an N-hydroxyalkyl($C_{1-30}$)-oxazolidine with a polycarboxylic acid can be mentioned. The N-hydroxyalkyl oxazolidine can be produced by reacting an aldehyde or ketone, such as formaldehyde, acetoaldehyde, propionaldehyde, benzaldehyde, acetone, methyl ethyl ketone, methyl isobutyl ketone or the like with a dialkanolamine such as diethanolamine, disopropanolamine, di-sec-butanolamine or the like. The polycarboxylic acid is a dihydric or polyhydric organic acid containing 2 to 100 carbon atoms, such as succinic acid, adipic acid, azelaic acid, sebacic acid, phthalic acid, isophthalic acid, maleic acid, fumaric acid, etc.

Poly(cyclic carbonate) (B6): the compound obtainable by reacting a polyepoxide (B1) with carbon dioxide can be mentioned.

Poly(unsaturated carboxylic acid ester) (B7): the compound obtainable by the esterification reaction of the polyol (F) to be described hereinafter with (meth)acrylic acid can be mentioned.

Polyallyl compound (B8): polyesters of polycarboxylic acids having 2~6 or more functional groups, with allyl alcohol, triallyl isocyanurate, etc. can be mentioned.

[Compound (C) which Has 2 or More Nucleophilic Groups]

The compound (C) having 2 or more nucleophilic groups per molecule includes at least one member selected from the group consisting of polyol (F), polyamino compound (C1) and its precursor (C2), and polythiol (C3). The ions formed on dissociation of protons from the nucleophilic groups of such compounds also fall within the scope of the invention. Preferred, among these, is the polyamino compound (C1) or its precursor (C2).

The nucleophilic group which may be contained in said compound (C) having 2 or more nucleophilic groups is not particularly restricted as far as its Swain-Scott's nucleophilicity parameter $n_{CH3I}$ (J. Am. Chem. Soc. 90, 17, p. 319, 1968) is within the range of 0 to 12, but includes, for example, hydroxy, primary-, secondary- or tertiary-amino, thiol, sulfide, phosphine, arsine, organoselenium, hydroxide, phenoxide, halide anion (e.g. chloride anion) and carboxylate ion (acetate anion), among others.

The polyol (F) is not particularly restricted as far as it is a compound having 2 or more hydroxyl groups per molecule, but includes, for example, poly(2~8)hydric alcohol (F-1), polyalkylene ether polyol (F-2), polyester polyol (F-3), polymer polyol (F-4), polybutadiene polyol (F-5), castor oil polyol (F-6), acrylic polyol (F-7), and a mixture of two or more of such polyols.

The poly(2~8)hydric alcohol (F-1) includes hydrocarbon series polyhydric alcohols of 2 to 12 carbon atoms which may optionally have an ether group. More particularly, there can be mentioned dihydric alcohols such as ethylene glycol, propylene glycol, 1,3-butylene glycol, 1,4-butanediol, 1,6-hexanediol, 3-methylpentanediol, diethylene glycol, neopentyl glycol, 1,4-bis(hydroxymethyl)cyclohexane, 1,4-bis(hydroxyethyl)benzene, 2,2-bis(4,4'-hydroxycyclohexyl)propane, etc.; trihydric alcohols such as glycerin, trimethylolpropane, etc.; and tetra-~octahydric alcohols such as pentaerythritol, diglycerin, α-methyl glucoside, sorbitol, xylytol, mannitol, dipentaerythritol, glucose, fructose, sucrose and so on.

The polyalkylene ether polyol (F-2) includes alkylene oxide (AO) adducts of active hydrogen-containing polyfunctional compounds having 2 to 8 functional groups (a) and mixtures of two or more of such adducts. The number average molecular weight of said polyalkylene ether polyol (F-2) is generally 500 to 20,000, preferably 500 to 10,000, more preferably 1,000 to 3,000.

The active hydrogen-containing polyfunctional compound (a) includes polyhydric alcohol (a1), polyhydric phenol (a2), amine (a3), polycarboxylic acid (a4), phosphoric acid (a5) and polythiol (a6), among others.

The polyhydric alcohol (a1): the same compounds as those mentioned for said poly(2~8)hydric alcohol can be mentioned.

The polyhydric phenol (a2): phenol compounds having 6 to 15 carbon atoms and 2 or 3 functional groups, for example polyphenols such as pyrogallol, catechol, hydroquinone, etc. and bisphenols such as bisphenol A, bisphenol F, bisphenol S, etc.

The amine (a3) includes monoamines such as $C_{1-20}$ alkylamines (e.g. butylamine), aniline, etc.; aliphatic polyamines having 2~10 or more carbon atoms and 2~8 or more functional groups, such as ethylenediamine, trimethylenediamine, hexamethylenediamine, diethylenetriamine, etc.; heterocyclic polyamines such as piperazine, N-aminoethylpiperazine and the compounds described in JP Publication Sho-55-21044; alicyclic polyamines such as dicyclohexylmethanediamine, isophoronediamine, etc.; aromatic polyamines such as phenylenediamine, tolylenediamine, diethyltolylenediamine, xylylenediamine, diphenylmethanediamine, diphenyl ether diamine, polyphenylmethane polyamine, etc.; and mono-, di- or tri-alkanol ($C_{2-4}$)amines such as monoethanolamine, diethanolamine, triethanolamine, triisopropanolamine, etc.

The polycarboxylic acid (a4) includes carboxylic acids containing 4 to 10 carbon atoms and 2 to 3 functional groups, for example aliphatic polycarboxylic acids such as succinic acid, adipic acid, etc. and aromatic polycarboxylic acids such as phthalic acid, terephthalic acid, trimellitic acid, etc.

The phosphoric acid (a5) includes phosphoric acid and phosphonic acid, among others. The polythiol (a6) includes multifunctional polythiols obtainable by reacting any of said glycidyl group-containing compounds with hydrogen sulfide.

The active hydrogen-containing compound (a) mentioned above may be used in a combination of 2 or more different species.

The AO to be added to said active hydrogen-containing compound (a) includes said hydrocarbon oxides containing 2 to 25 carbon atoms, such as ethylene oxide (EO), propylene oxide (PO), 1,2-, 2,3- or 1,3-butylene oxide, tetrahydrofuran (THF), styrene oxide, α-olefin oxides, and epichlorohydrin, among others.

The AO to be added may be a single species or 2 or more species. In the latter case, the mode of addition may be any of block addition (tipped, balanced, active secondary, etc.), random addition, and mixed addition [random addition followed by tipping: 0 to 50 weight % (preferably 5 to 40 weight %) of ethylene oxide chains randomly distributed within the molecule and 0 to 30 weight % (preferably 5 to 25 weight %) of EO chains tipping molecular ends].

Preferred species or combination of species of AO are EO alone, PO alone, THF alone, PO plus EO, PO and/or EO plus THF (in the case of a combination, random, block and a mixture thereof).

The number of functional groups of said (F-2) is generally 2 to 8, preferably 2 to 3, more preferably 2. The degree of unsaturation of (F-2) is preferably as low as possible, and is generally not more than 0.1 meq/g, preferably not more than 0.05 meq/g, more preferably not more than 0.02 meq/g. The primary hydroxyl content of (F-2) is not particularly restricted but is preferably 30 to 100%, more preferably 50 to 100%, and still more preferably 70 to 100%.

The polyester polyol (F-3) includes the condensed polyester diol obtainable by reacting a low molecular diol and/or a polyalkylene ether diol having a molecular weight of not more than 1000 with a dicarboxylic acid, the polylactonediol obtainable by the ring-opening polymerization of a lactone, and the polycarbonate diol obtainable by reacting a low molecular diol with a lower alcohol (e.g. methanol) carbonic diester.

The low molecular weight diol mentioned above includes ethylene glycol, diethylene glycol, propylene glycol, dipropylene glycol, 1,4- or 1,3-butanediol, neopentyl glycol, 1,6-hexanediol; cyclic group-containing low molecular weight diols (e.g. those described in JP Publication Sho-45-1474: bis(hydroxymethyl)cyclohexane, bis(hydroxyethyl)benzene, bisphenol A-EO adduct, etc.], and mixtures of two or more of such diols.

The polyalkylene ether diol having a molecular weight of not more than 1,000 includes polytetramethylene ether glycol, polypropylene glycol, polyethylene glycol, and mixtures of two or more of such glycols.

The dicarboxylic acid mentioned above includes aliphatic dicarboxylic acids (e.g. succinic acid, adipic acid, azelaic acid, sebacic acid, etc.), aromatic dicarboxylic acids (e.g. terephthalic acid, isophthalic acid, phthalic acid, etc.), ester-forming derivatives of such dicarboxylic acids [e.g. acid anhydrides and lower alkyl ($C_{1-4}$) esters], and mixtures of 2 or more of them: the lactone mentioned above includes ε-caprolactone, γ-butyrolactone, γ-valerolactone, and mixtures of 2 or more such lactones.

The polyester polyol (F-3) specifically includes polyester diols such as polyethylene adipate diol, polybutylene adipate diol, polyhexamethylene adipate diol, polyneopentyl adipate diol, poly(ethylene-propylene) adipate diol, poly(ethylene-butylene) adipate diol, poly(butylene-hexamethylene) adipate diol, polydiethylene adipate diol, poly(polytetramethylene ether) adipate diol, polyethylene azelate dial, polyethylene sebacate diol, polybutylene azelate diol, polybutylene sebacate diol, etc.; polylactonediols such as polycaprolactone-diol and -triol, etc.; and polycarbonate diols such as polyhexamethylene carbonate diol, etc.

The polymer polyol (F-4) includes the polymer dispersion obtainable by polymerizing a radical-polymerizable monomer [e.g. styrene, (meth)acrylonitrile, a (meth)acrylate ester, vinyl chloride, a mixture of 2 or more of them] in a polyol (said polyalkylene ether polyol and/or polyester polyol).

After completion of such a polymerization reaction, the organic solvent and impurities such as polymerization initiator decomposition products and unreacted monomer are preferably removed by the routine procedure.

The polymer polyol (F-4) thus obtained is a translucent–opaque white–yellowish brown dispersion containing the polymerized monomer, i.e. the polymer, in a proportion of generally 30 to 70%, preferably 40 to 60%, more preferably 45 to 55%, most preferably 50 to 55%, in the polyol.

The polybutadiene polyol (F-5) includes the polyol of 1,2-vinyl structure, the polyol of 1,2-vinyl and 1,4-trans structure, and the polyol of 1,4-trans structure. The molar ratio of 1,2-vinyl structure to 1,4-trans structure can be varied freely and may for example be 100:0 to 0:100. The polybutadiene glycol (F-5) includes both the homopolymer and the copolymer (e.g. styrene-butadiene copolymer, acrylonitrile-butadiene copolymer, etc.), and the corresponding hydrogenation products (rate of hydrogenation: e.g. 20 to 100%). The number average molecular weight of the polybutadiene glycol (F-5) is generally 500 to 10,000.

The castor oil polyol (F-6) includes castor oil and modified castor oil (castor oil modified with a polyhydric alcohol such as trimethylolpropane, pentaerythritol or the like).

The acrylic polyol (F-7) includes polymers of 1 to 100 mole adducts of $C_{2-4}$ alkylene oxides to (meth)acrylic acid, such as 2-hydroxyethyl acrylate, 2-hydroxypropyl acrylate, 2-hydroxyethyl methacrylate, 2-hydroxypropylmethacrylate, polyethylene glycol (degree of polymerization: 2 to 100) monoacrylate, polypropylene glycol (degree of polymerization: 2 to 100) monoacrylate, polyethylene glycol (degree of polymerization: 2 to 100) monomethacrylate, polypropylene glycol (degree of polymerization: 2 to 100) monomethacrylate and so on. These compounds may be homopolymers or copolymers. In the case of a copolymer, the partner comonomer is not particularly restricted but includes (meth)acrylate esters having a hydrocarbon group of 1 to 30 carbon atoms [e.g. methyl acrylate, n-butyl methacrylate, 2-ethylhexyl acrylate, etc.] and hydrocarbon vinyl monomers of 6 to 30 carbon atoms [e.g. styrene, butadiene, etc.].

The number average molecular weight of the acrylic polyol (F-7) is generally 500 to 10,000.

The hydroxyl equivalent (molecular weight per hydroxyl group) of polyol (F) is generally 100 to 10,000, preferably 250 to 5,000, more preferably 500 to 1,500.

The polyamino compound (C1) or its precursor (C2) is not particularly restricted as far as it is a compound having 2 or more active hydrogen atoms derived from primary and/or secondary amino groups per molecule or its precursor, and a suitable species can be judiciously selected according to the intended use or purpose. Preferred is a compound having 2 to 10 active hydrogen atoms derived from primary and/or secondary amino groups or a precursor thereof, and the more preferred is a compound having 3 to 6 active hydrogen atoms or a precursor thereof. The active hydrogen equivalent (molecular weight per active hydrogen atom) of the polyamino compound (C1) or its precursor (C2) is generally 15 to 500, preferably 20 to 200. When the active hydrogen equivalent is not more than 500, the crosslinked structure is not loose so that the chemical resistance, mechanical strength and other physical properties of the cured product are satisfactory. When the active hydrogen equivalent is not less than 15, the chemical resistance, mechanical strength and other physical properties of the cured product are satisfactory. In the case of the precursor (C2), the active hydrogen equivalent is that of the amino compound to which it is converted.

The polyamino compound (C1) includes the following groups of compounds (P1) to (P9).

(P1): Aliphatic polyamines ($C_{2-18}$, number of functional groups: 2 to 7, molecular weight: 60 to 500):
  (i) Aliphatic polyamines [$C_{2-6}$ alkylenediamines (e.g. ethylenediamine, propylenediamine, trimethylenediamine, tetramethylenediamine, hexamethylenediamine, etc.), polyalkylene($C_{2-6}$) polyamines [diethylenetriamine, iminobispropylamine, bis(hexamethylene)triamine, triethylenetetramine, tetraethylenepentamine, pentaethylenehexamine, etc.]];
  (ii) Alkyl($C_{1-4}$) or hydroxyalkyl($C_{2-4}$) substitution products of said amines [dialkyl ($C_{1-3}$) aminopropylamine, trimethylhexamethylenediamine, aminoethylethanolamine, 2,5-dimethyl-2,5-hexamethylenediamine, methyliminobispropylamine, etc.];
  (iii) Alicycle- or heterocycle-containing aliphatic polyamines [e.g. 3,9-bis(3-aminopropyl)-2,4,8,10-tetraoxaspiro[5.5]undecane];
  (iv) Aromatic ring-containing aliphatic amines ($C_{8-15}$) [e.g. xylylenediamine, tetrachloro-p-xylylenediamine, etc.];

(P2): Alicyclic polyamines ($C_{4-15}$, number of functional groups: 2~3):
  1,3-Diaminocyclohexane, isophoronediamine, menthenediamine, 4,4'-methylenedicyclohexanediamine (hydrogenated methylenedianiline), etc.;

(P3): Heterocyclic polyamines ($C_{4-15}$, number of functional groups: 2 to 3):
  5 Piperazine, N-aminoethylpiperazine, 1,4-diaminoethylpiperazine, 1,4-bis(2-amino-2-methylpropyl)piperazine, etc.;

(P4): Aromatic polyamines ($C_{6-20}$, number of functional groups: 2 to 3, molecular weight: 100 to 1000):
  (i) Unsubstituted aromatic polyamines [e.g. 1,2-, 1,3- and 1,4-phenylenediamine, 2,4'- and 4,4'-diphenylmethanediamine, crude diphenylmethane diamine (polyphenylpolymethylene polyamine), diaminodiphenyl sulfone, benzidine, thiodianiline, bis (3,4-diaminophenyl)sulfone, 2,6-diaminopyridine, m-aminobenzylamine, triphenylmethane-4,4',4"-triamine, naphthylenediamine, etc.;

(ii) Nuclearly $C_{1-4}$ alkyl[e.g. methyl, ethyl, n- or i-propyl, butyl]-substituted aromatic polyamines, such as 2,4- and 2,6-tolylenediamines, crude tolylenediamine, diethyltolylenediamine, 4,4'-diamino-3,3'-dimethyldiphenylmethane, 4,4'-bis(o-toluidine), dianisidine, diaminoditolyl sulfone, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenyl sulfone, etc.] and various mixtures of isomers thereof;

(iii) Aromatic polyamines having electron-withdrawing groups (halogen, e.g. Cl, Br, I, F; alkoxy, e.g. methoxy, ethoxy, etc.; nitro, etc.) as nuclear substituents [e.g. methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline; 4,4'-diamino-3,3'-dimethyl-5,5'-dibromo-diphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl) sulfone, bis(4-amino-3-methoxyphenyl)decane, bis(4-aminophenyl)sulfide, bis(4-aminophenyl)telluride, bis(4-aminophenyl)selenide, bis(4-amino-3-methoxyphenyl)disulfide, 4,4'-methylenebis(2-iodoaniline), 4,4'-methylenebis(2-bromoaniline), 4,4'-methylenebis(2-fluoroaniline), 4-aminophenyl-2-chloroaniline, etc.]:

(iv) Aromatic polyamines having secondary amino groups [the above aromatic polyamines (i) to (iii) in which —NH—R' has been substituted for all or some of the —NH$_2$ groups (R' is an alkyl group, e.g. a lower alkyl group such as methyl and ethyl)]. [e.g. 4,4'-di(methylamino)diphenylmethane, 1-methyl-2-methylamino-4-aminobenzene, etc.];

(P5) Polyamide polyamines:
Polyamide polyamines (number average molecular weight 200 to 1000) which are obtainable by condensation of a dicarboxylic acid (e.g. a dimer acid) with a stoichiometric excess (not less than 2 moles per mole of acid) of a polyamine (said alkylene diamine or polyalkylene polyamine having a number of functional groups of 2 to 7) etc.;

(P6) Polyether polyamines:
Hydrides (molecular weights 100 to 1000) of cyanoethylated polyether polyols (e.g. said polyalkylene glycols) etc.;

(P7) Epoxy-added polyamines:
Epoxy-added polyamines (molecular weights 100 to 1000) which are obtainable by the addition of 1 to 30 moles of an epoxy compound (e.g. said polyepoxide (B1) or a monoepoxide, such as ethylene oxide, propylene oxide and phenyl glycidyl ether) to a polyamine (e.g. said alkylenediamine or polyalkylene polyamine);

(P8) Cyanoethylated polyamines:
Cyanoethylated polyamines obtainable by the addition reaction of acrylonitrile with a polyamine (e.g. said alkylenediamine or polyalkylenepolyamine) [e.g. bis-cyanoethyldiethylenetriamine; molecular weight: 100 to 500], etc.;

(P9) Other polyamine compounds:
(i) Hydrazines (hydrazine, monoalkylhydrazines, etc.);
(ii) Dihydrazides (succinic acid dihydrazide, adipic acid dihydrazide, isophthalic acid dihydrazide, terephthalic acid dihydrazide, etc.);
(iii) Guanidines (e.g. butylguanidine, 1-cyanoguanidine, etc.);
(iv) Dicyandiamide etc.; and mixtures of two or more of them.

Among the above (P1) to (P9), preferred for the purpose of imparting high-speed curability to the curable composition of the present invention are (P1), (P2), (P3), (P4) and (P5), and particularly preferred are (P1) and (P4).

When the polyamino compound precursor (C2) was used as the compound (C) having 2 or more nucleophilic groups per molecule, the curable composition of the present invention can be provided as a one-component curable composition because said polyamino compound precursor (C2) reacts with water to generate primary or secondary amino groups but remains stable in the absence of water.

The polyamino compound precursor (C2) mentioned above may for example be a dehydrative condensation product of a primary or secondary amine with a carbonyl compound.

The dehydrative condensation product of a primary or secondary amine with a carbonyl compound, mentioned just above, includes a hetero ring-containing compound (C21) containing at least 2 heterocyclic groups of the following general formula (4) per molecule, a ketimine compound (C22) of the following general formula (6), and a polyisocyanate (C23). Preferred are the hetero ring-containing compound (C21) containing at least two heterocyclic groups of the following general formula (4) per molecule and the ketimine compound (C22) of the general formula (6), and particularly preferred is the hetero ring-containing compound (C21) having at least 2 heterocyclic groups of the following general formula (4) per molecule.

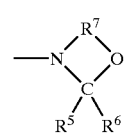

(4)

wherein $R^5$ and $R^6$ each independently represents a hydrogen atom, a straight-chain or branched-chain alkyl or alkenyl group of 1 to 6 carbon atoms or an aryl or aralkyl group of 6 to 8 carbon atoms; $R^5$ and $R^6$ may jointly form a cycloalkyl group of 5 to 7 carbon atoms; $R^7$ represents an alkylene group of 1 to 10 carbon atoms.

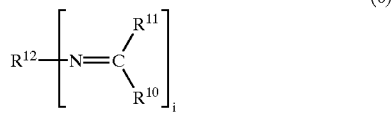

(6)

wherein i represents an integer of 2 to 10; $R^{10}$ and $R^{11}$ each independently represents a hydrogen atom, a straight-chain or branched-chain alkyl or alkenyl group of 1 to 6 carbon atoms or an aryl or aralkyl group of 6 to 8 carbon atoms; $R^{10}$ and $R^{11}$ may jointly form a cycloalkyl group of 5 to 7 carbon atoms; $R^{12}$ represents the residue of said polyamino compound (C).

The hetero ring-containing compound (C21) is not particularly restricted as far as it contains at least two heterocyclic groups of the general formula (4) per molecule but is preferably a compound of the following general formula (5).

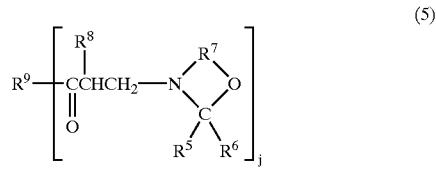

(5)

wherein j is an integer of 2 to 10; $R^5$, $R^6$ and $R^7$ are as defined for the above general formula (4); $R^8$ represents a hydrogen atom or a methyl group; $R^9$ represents the residue of said polyamino compound (C1) or polyol (F).

In the hetero ring-containing compound (C21) of the general formula (4), $R^5$ and $R^6$ include hydrogen; methyl, ethyl, n-propyl, iso-propyl, butyl, iso-butyl, sec-butyl, tert-butyl, n-pentyl, iso-pentyl, neopentyl, tert-pentyl, n-hexyl, iso-hexyl; vinyl, allyl, methallyl, isopropenyl, propenyl; phenyl; and benzyl; among others. In addition, $R^5$ and $R^6$ may be joined to each other and, taken together with the carbon atom to which $R^5$ and $R^6$ are attached, form a cyclopentyl, cyclohexyl or cycloheptyl group. From the standpoint of curing speed, preferably at least one of $R^5$ and $R^6$ is a hydrogen atom or a straight-chain or branched-chain alkyl group of 1 to 3 carbon atoms, and more preferably at least one of $R^5$ and $R^6$ is a hydrogen atom, a methyl group or an ethyl group.

$R^7$ includes but is not limited to methylene, ethylene, trimethylene, propylene, tetramethylene, ethylethylene, pentamethylene, hexamethylene, heptamethylene and octamethylene. Among these, alkylene groups of 1 to 4 carbon atoms, such as ethylene, propylene, tetramethylene and pentamethylene, are preferred from the standpoint of curing speed.

In the above compound of the general formula (5), $R^8$ is preferably a methyl group. When $R^8$ is methyl, the compound assumes the methacryl structure which is superior to the acryl structure in the resistance to hydrolysis.

The number average molecular weight of the compound of the general formula (5) is generally 400 to 20,000, preferably 600 to 2,000. The viscosity (25° C.) of the compound is generally 200 to 200,000 mPa·s, preferably 400 to 50,000 mPa·s. The hetero ring equivalent is generally 150 to 2,000, preferably 150 to 500.

The hetero ring-containing compound (C21) can be generally synthesized by the dehydrative condensation reaction of a compound having at least one secondary amino group attached to a hydroxyalkyl group per molecule with a compound having a ketone or aldehyde group per molecule, and has the property to readily give the hydroxyalkyl-bound secondary amine and the corresponding aldehyde or ketone in the presence of water and thereby function as a curing agent for epoxy resin. Therefore, this hetero ring-containing compound (C21) remains stable even in admixture with the compound (B) unless water is supplied from outside the system, thus being of great use as a curing agent for a one-component curable composition.

The compound of the general formula (5) can be produced by said dehydration condensation reaction of a compound having at least one secondary amino group attached to a hydroxyalkyl group per molecule with a compound having a ketone or aldehyde group or alternatively by the method in which a compound obtainable by Michael addition of an alkanolamine to a (meth) acrylate ester and a compound having a ketone or aldehyde group per molecule are subjected to dehydrative condensation and the resulting condensation product is further reacted with a polyamino compound (C1) or a polyol (F). The latter method is advantageous in that the Michael reaction does not substantially involve the side reaction of the secondary amine formed being added to the (meth)acryloyloxy group to give a tertiary amine so that the storage stability of a one-component curable composition can be remarkably improved.

The ketimine compound (C22) of the general formula (6) also reacts with water to give a primary or secondary amino group. In the above general formula (6), $R^{10}$ and $R^{11}$ include the same species as mentioned for $R^5$ and $R^6$ in the above general formula (4).

The method of producing the ketimine compound (C22) of the general formula (6) is not particularly restricted but may for example comprise subjecting a polyamino compound (C1) and a carbonyl compound to dehydrative condensation.

The polyisocyanate (C23) mentioned above is also a compound which reacts with water to give a primary or secondary amino group. As the polyisocyanate (C23), the same species as those mentioned for compound (B2) can be used.

As the compound (C) having 2 or more nucleophilic groups per molecule in the present invention, the polythiol (C3) can also be employed. The polythiol (C3) includes alkylthiol compounds having 1 to 20 carbon atoms and 2 or more of functional groups, for example 1,4-butanedithiol, 1,8-octadienedithiol, etc., the thiol obtainable by reacting a polyepoxide (B1) with hydrogen sulfide; and the ester of a mercaptocarboxylic acid having 2 to 20 carbon atoms and 2 or more SH groups (e.g. mercaptoacetic acid, mercaptopropionic acid, mercaptobutyric acid, mercaptohexanoic acid, mercaptooctanoic acid, mercaptostearic acid) with a polyol (F). Preferred, among these, is the thiol obtainable by the reaction of a polyepoxide (B1) with hydrogen sulfide.

In the case where all of $X^1$, $Y^1$ and $Z^1$ in said hetero ring-containing compound (A) are oxygen atoms, the polyol (C3) is chosen as said compound having 2 or more nucleophilic groups per molecule.

When said polyisocyanate (C23) is used as the compound (C) having 2 or more nucleophilic groups per molecule, the polyisocyanate reacts with water to give amino groups which, in turn, may react with a polyisocyanate. However, as (B), a compound other than a polyisocyanate is preferably used.

(Composition)

As regards the relative amount of the compound (B) having 2 or more electrophilic groups and the compound (C)

having 2 or more nucleophilic groups in the composition of the present invention, the ratio of the nucleophilic fraction in (C) to the electrophilic fraction in (B) should be 0.7 to 1.3, preferably 0.9 to 1.1. When the ratio is not less than 0.7 or not more than 1.3, the curability is well sustained and the water resistance and mechanical strength of the cured product are not decreased, thus are satisfactory. As regards the relative amount of the compound (B) and the hetero ring-containing compound (A), the ratio of the heterocyclic fraction in (A) to the electrophilic fraction in (B) is 0.01 to 1.0, preferably 0.057 to 0.8. When said ratio is not less than 0.01 or not more than 1.0, the curability is well sustained and the water resistance and mechanical strength of the cured product are not decreased, thus are satisfactory.

The addition amount of the hetero ring-containing compound (A) based on 100 weight parts of the total curable composition is generally 0.1 to 200 weight parts, preferably 0.5 to 100 weight parts, more preferably 1 to 50 weight parts. If the amount of (A) is less than 0.1 weight part, both the cure-accelerating effect and viscosity-reducing effect will be inadequate. On the other hand, if the amount of (A) exceeds 200 weight parts, the physical properties, such as water resistance, chemical resistance and mechanical strength, will be adversely affected.

For the purpose of accelerating the curing speed, the curable composition of the present invention may be optionally supplemented with a basic compound (E).

The basic compound (E) includes a tertiary amine compound (E1), an alkali compound (E2) such as sodium methoxide, sodium hydroxide, potassium hydroxide, lithium carbonate, etc., and a Lewis base compound (E3) such as triethylphosphine, triphenylphosphine, etc. Preferred, among them, is a tertiary amine compound (E1).

Preferred tertiary amine compound (E1) for (E) is not particularly restricted as far as it contains a tertiary amino group within the molecule. For example, there can be mentioned aliphatic amines having 3 to 20 carbon atoms and 1 to 4 amino groups, such as trimethylamine, triethylamine, tetraethylmethylenediamine, tetramethylpropane-1,3-diamine, tetramethylhexane-1,6-diamine, pentamethyldiethylenetriamine, pentamethyldipropylenetriamine, bis(2-dimethylaminoethyl)ether, ethylene glycol (3-dimethyl) aminopropyl ether, dimethylaminoethanol, dimethylaminoethoxyethanol, N,N,N'-trimethylaminoethylethanolamine, dimethylcyclohexylamine, etc.; aromatic amines having 9 to 20 carbon atoms and 1 to 4 amino groups, such as dimethylbenzylamine, N,N-dimethylaminomethylphenol (trivial name: DMP-10), tris (N,N-dimethylaminomethyl)phenol (trivial name: DMP-30), etc.; and heterocyclic compounds having 4 to 20 carbon atoms and 1 to 6 amino groups, such as 1,2-dimethylimidazole, dimethylpiperazine, N-methyl-N'-(2-dimethylamino)-ethylpiperazine, N-methylmorpholine, N-(N', N'-dimethylaminoethyl)morpholine, N-methyl-N'-(2-hydroxyethyl)morpholine, 1,8-diazabicyclo(5.4.0)-undecene-7 (trivial name: DBU), 1,5-diazabicyclo(4.3.0)-nonene-5 (trivial name: DBN), 6-dibutylamino-1,8-diazabicyclo(5.4.0)-undecene-7 (trivial name: DBA-DBU), triethylenediamine and hexamethylene tetramine, among others.

The kind and amount of basic compound (E) can be judiciously selected according to the desired cure speed and pot life but generally about 0.1 to 50 weight parts thereof can be added with advantage per 100 weight parts of the hetero ring-containing compound (A).

Where necessary, a catalyst may be added for accelerating the cure speed. As the catalyst for catalyzing the hydrolysis of the hetero ring-containing compound (C21) or ketimine compound (C22), there can be mentioned formic acid, acetic acid, propionic acid and dibutyltin dilaurate, among others.

As the catalyst for catalyzing the reaction between the primary or secondary amine produced by hydrolysis and the electrophilic group (preferably epoxy group) of (B), said tertiary amines, phosphines, and $C_{3-30}$ hydrocarbon phosphines such as triphenylphosphine, tributylphosphine, etc. can be mentioned. Preferred, among these, are tertiary amines, and particularly preferred are aliphatic tertiary amines such as N,N-dimethylpropylamine, N,N,N',N'-tetramethylhexamethylenediamine, etc.; alicyclic tertiary amines such as N-methylpyrrolidine, N,N'-dimethylpiperazine, etc.; and aromatic tertiary amines such as benzyldimethylamine and dimethylaminomethylphenol, etc.

The curable composition of the present invention [1] may contain a thermoplastic resin (G) and/or a deodorizer (H). The thermoplastic resin (G) is not particularly restricted but includes rubbers, general-purpose resins, engineering plastics and special engineering plastics, among others. The rubber may be liquid or solid, including natural rubber and synthetic rubber.

The synthetic rubber includes diene, olefin, vinyl, polysulfide, silicon-containing, fluorine-containing, urethane and phosphorus-containing rubbers, among others.

The diene rubber includes butadiene rubber, isoprene rubber, methyl rubber, butyl rubber, polypentadiene rubber, nitrile rubber (acrylonitrile/butadiene copolymer, acrylonitrile/isoprene copolymer), styrene/butadiene rubber (SBR), acrylate/butadiene copolymer, isobutylene/isoprene copolymer, acrylonitrile/chloroprene copolymer, chloroprene rubber, polyethylene/butyl graft copolymer and styrene/butadiene/vinylpyridine copolymer, among others.

The olefin rubber includes ethylene propylene rubber (EPR), ethylene-propylene diene rubber (EPT), polyisobutylene, polyisobutylene oxide, polycyclopentene, chlorinated polyethylene, chlorinated polypropylene, chlorinated butyl rubber and chlorosulfonated polyethylene.

The vinyl rubber includes acrylic rubber (acrylate/acrylonitrile copolymer) and acrylate/chloroethyl vinyl ether copolymer.

The polysulfide rubber includes poly(alkylene sulfide) rubber (ethylene sulfide/propylene sulfide copolymer).

The silicon-containing rubber includes silicone rubber (alkylsiloxane condensate), for instance.

The fluorine-containing rubber includes fluoro rubber [e.g. trifluorochloroethylene/vinylidene fluoride copolymer, hexafluoropropylene/vinylidene fluoride copolymer, poly (dihydroperfluoroalkyl acrylate)], nitroso rubber, and poly (thiocarbonyl fluoride) rubber, among others.

The urethane rubber includes polyetherurethane rubbers and polyesterurethane rubbers.

The phosphorus-containing rubber includes polyphosphazenes.

As the rubber for the present invention, chlorohydrin rubber, polypropylene oxide rubber and polyether-polyester block copolymer can also be employed. The butadiene rubber mentioned above may be whichever of the cis and the trans forms.

The liquid rubber mentioned above includes those rubbers generally having number average molecular weights within the range of 2,000 to 10,000 and comprising polybutadiene, butadiene/styrene copolymer or the like having such terminal functional groups as hydroxyl, mercapto, amino, carboxyl, isocyanate or halogen.

The general-purpose resin mentioned above includes polyethylene, polypropylene, poly(ethylene terephthalate), poly(vinyl chloride) and polystyrene.

The engineering plastics include polyacetals, nylons, polycarbonates, modified polyphenylene oxide, poly (butylene terephthalate), ultra-high-molecular-weight polyethylene, polymethylpentene, polyvinyl alcohol and so on.

The special engineering plastics include polysulfone, polyphenylene sulfide, polyether sulfones, polyarylates, polyamideimides, polyimides, polyether ether ketone, polyetherimides, aromatic polyamides and fluororesins.

Preferred, among them, are rubbers and special engineering plastics. More preferred are polyether sulfones. Where necessary, these resins can be used in a combination of 2 or more species.

The addition ratio, by weight, of compound (B): thermoplastic resin (G) is generally 1:0.01~2, and preferred is 1:0.1~1.

The deodorizer (H) is not particularly restricted but includes activated carbon, zeolite, silica sol and silica gel, among others. Preferred, among these, is zeolite. The addition ratio, by weight, of hetero ring-containing compound (A):deodorizer (H) is 1:0.01~0.5, preferably 1:0.05~0.3.

Where necessary, the curable composition of the present invention may be further supplemented with (1) an adhesion improving agent, e.g. silane coupling agents, titanium coupling agents, etc.; (2) an antioxidant, e.g. hindered amines, hydroquinones, hindered phenols, sulfur-containing compounds, etc.; (3) an ultraviolet absorber, e.g. benzophenones, benzotriazoles, salicylate esters, metal complex salts, etc.; (4) a stabilizer, e.g. metal soaps, inorganic or organic salts of heavymetals (e.g. zinc, tin, lead, cadmium, etc.), organotin compounds, etc., (5) a plasticizer, e.g. phthalic esters, phosphate esters, fatty acid esters, epoxidized soybean oil, castor oil, liquid paraffin, alkylated polycyclic aromatic hydrocarbons, etc.; (6) a wax, e.g. paraffin wax, microcrystalline wax, polymer wax, beeswax, sperm wax, low-molecular-weight polyolefins, etc.; (7) a nonreactive diluent, e.g. benzyl alcohol, tar, pitumen, etc., (8) a reactive diluent, e.g. low-molecular-weight fatty acid glycidyl ethers, aromatic monoglycidyl ethers, (meth) acrylic esters, etc., (9) a filler, e.g. calcium carbonate, kaolin, talc, mica, bentonite, clay, sericite, asbestos, glass fiber, carbon fiber, aramid fiber, nylon fiber, acrylic fiber, glass powder, glass balloons, silas balloons, coal dust, acrylic resin powder, phenolic resin powder, metal powder, ceramic powder, zeolite, slate powder, etc., (10) a pigment or dye, e.g. carbon black, titanium dioxide, red iron oxide, red lead, parared, Purrusian blue, etc., (11) a solvent, e.g. ethyl acetate, toluene, alcohols, ethers, ketones, etc., (12) a foaming agent, and (13) a dehydrating agent, e.g. silane coupling agents, monoisocyanate compounds, carbodiimide compounds, etc. In addition, (14) an antistatic agent, (15) an antibacterial agent, (16) an antifungal agent, (17) a viscosity control agent (rheology modifier), (18) a perfume, (19) a flame retardant, (20) a catalyst, e.g. a phenol compound or an acid, (21) a leveling agent, (22) a dispersant, and (23) a radical polymerization initiator can also be incorporated. Of any of these additives, two or more species may be used in combination. As to the amount of such additives, the (B): additive ratio is generally 1:0.01~2, preferably 1:0.02~1.

(Method of Use)

The mode of use of the respective components and the package forms of the curable composition of the present invention includes the following (1) to (3), for instance.

(1) The components (A), (B) and (C) are independently stored and these three liquids are admixed in the field and allowed to cure. [The optional component basic compound (E) can be independently packaged as a fourth component and mixed with the other components in the field or added to (A) and/or (C) and packaged as such].

(2) The mixture of (A) and (B) and the (C) are respectively stored, and the two packages are mixed in the field. [The optional component basic compound (E) can be independently packaged as a third component and mixed with the other components or packaged together with (C) for use in the field.

(3) The mixture of (A), (B) and (C) is packaged as a one-component composition and used as it is in the field. [The optional component basic compound (E) can be independently packaged as a second component and mixed with the other components or packaged together with said mixture for use in the field].

The optimum mode of use and package form can be judiciously selected with reference to the intended application, purpose, field temperature and humidity, and other conditions. When the composition is to be used at low temperature, the package forms (1) and (2) are preferred because the viscosity of each component in the composition can be held low.

Referring further to the mode of use and package form of each component in the composition of the present invention, when the polyamino compound precursor (C2) is used as the compound (C) having 2 or more nucleophilic groups per molecule, the curable composition can be dehydrated and stored as a one-component composition because said polyamino compound precursor (C2) reacts with water to give a primary or secondary amino group and remains stable unless water is available. The water content of the mixture should be not more than 5.0%, preferably not more than 1.0%. In the field, this system can be put to use as it is.

When said polyamino compound precursor (C2) is not used as the compound (C) having 2 or more nucleophilic groups per molecule, admixing (A), (B) and (C) results in initiation of the curing reaction of (B) and, therefore, the above package form (1) or (2) is employed.

The method of manufacturing the curable composition of the present invention is not particularly restricted as far as the materials used can be blended and dispersed. For example, the following methods can be employed.

(i) In a suitable vessel such as a glass beaker, a can, and a plastic cup, the materials are manually kneaded with a stirring rod or a spatula.

(ii) The kneading is carried out by means of a double helical ribbon mixer or a gate mixer.

(iii) The kneading is carried out by means of a planetary mixer.

(iv) The kneading is carried out with a beads mill.

(v) The kneading is carried out with a 3-rollers mill.

(vi) The kneading is carried out with an extruder type kneading-extruding machine.

The method of using the curable composition of the present invention is not particularly restricted. Thus, by designing the reactivity of compound (C) judiciously, the curable composition can be used under any practical field conditions, (1) at a low temperature not more than 5° C., (2) at room temperature from 5 to 40° C., or (3) at a high temperature from about 40 to 200° C.

The above condition (1) includes a cold climate, an outdoor environment in winter months, a refrigerator or freezer condition, etc. By using a compound (C) of high reactivity such as an aliphatic polyamine, the composition can be cured in a practical time.

The condition (2) is an ordinary environment. The composition can be rendered curable by using a compound (C) of medium reactivity, such as an alicyclic polyamine.

The condition (3) is an environment requiring heating. While any formulation can be used, the use of compound (C) of high reactivity results in a short pot life so that use thereof becomes difficult. The improved workability can be insured by using a compound (C) of low reactivity, such as an aromatic polyamine.

In the mode of use where the polyamino compound precursor (C2) is chosen as the compound (C) having 2 or more nucleophilic groups per molecule and the curable composition is used as a one-component composition, it is possible to use the ordinary curing method utilizing the water available from an atmosphere or the substrate such as concrete, the method in which water is added and admixed immediately before application, the spray method in which the atmospheric moisture is entrapped in the mist, or the method comprising the use of a two-fluid spray nozzle for application in which water is simultaneously supplied.

The compound (B) having 2 or more electrophilic groups reactive with thiol or —S$^-$ groups per molecule can be used optionally in combination with said basic compound (E). The combination use of such a basic compound leads to further accelerated cure at room temperature~low temperature.

Because the heterocyclic groups in the hetero ring-containing compound (A) contain no active hydrogen, the compound is low in viscosity and does not have an irritating odor like that of the phenol or polyamine compound used for the purpose of accelerating cure nor has it a distinctive odor like that of polymercaptan compounds, and has a reduced dermal irritation potential as compared with the epoxy-containing low molecular-weight compound which is added for viscosity reduction, thus contributing to improved workability.

Furthermore, the hetero ring-containing compound (A) is built into the network structure of the cured product through the curing reaction so that it does not adversely affect the physical properties, such as water resistance, chemical resistance, weathering resistance and mechanical strength, of the cured product.

[2] Curing Agent

The reaction product (T1) obtainable by reacting said hetero ring-containing compound (A) with said compound (C) having 2 or more nucleophilic groups per molecule in advance is of use as the curing agent for said compound (B) having 2 or more electrophilic groups per molecule. By blending said reaction product (T1) with the compound (B) having 2 or more electrophilic groups per molecule, the curing reaction of said compound (B) having 2 or more electrophilic groups per molecule can be initiated.

The method of preparing the reaction product (T1) for use as the curing agent in the present invention [2] is not particularly restricted as far as (A) can be reacted with (C) but, for example, it can be obtained by mixing (A) and (C) as they are or in a solvent at low temperature room temperature.

As to the relative amount of (A) and (C) to be reacted for the preparation of said reaction product (T1), the heterocyclic fraction in (A) to the nucleophilic fraction in (C) is 0.01~1:1, preferably 0.05~0.8:1. When the ratio of the heterocyclic fraction in (A) is not greater than 1, the chemical resistance and mechanical properties of the cured product are satisfactory, and when said ratio is not less than 0.01, the cure speed is increased.

Since the reaction product (T1), which is the main component, contains thiol groups, the (B), preferably (Bi), can be caused to cure at a high speed even at room temperature ~low temperature.

Moreover, when said compound (C) having 2 or more nucleophilic groups per molecule contains amino groups, these amino groups have been partially or entirely modified by (A) so that the dermal irritation potential is low as compared with the usual amine type curing agent. Moreover, since both thiol and basic amino functions occur in one and the same molecule, the chemical resistance, water resistance, mechanical strength and other physical properties of the cured product are superior as compared with the case in which a thiol type curing agent and a basic substance are used in combination.

Preferred reaction product (T1) has 2 to 6 active hydrogen atoms derived from thiol groups and/or primary and/or secondary amino groups. The active hydrogen equivalent of the reaction product (T1) is generally 50 to 500, preferably 50 to 350. If the active hydrogen equivalent exceeds 500, the crosslinked network will be loose to adversely affect the chemical resistance, mechanical strength and other physical properties of the cured product. On the other hand, it is technically difficult to synthesize a compound having an active hydrogen equivalent of not more than 50.

When the reaction product (T1) is used as the curing agent for (B), preferably (B1), the equivalent ratio of the number of epoxy groups in the polyepoxide to the active hydrogen in the curing agent is generally 0.5 to 5.0, preferably 0.7 to 2.0.

By adding, to a composition, the compound (B) having 2 or more electrophilic groups reactive with thiol or —S$^-$ groups per molecule, the cure speed of the composition can be remarkably increased. This cure-accelerating effect is apparently attributable to the high reactivity of the amino groups of this compound in the composition with respect to the heterocyclic groups in (A) and the high reactivity of the thiol groups formed with the electrophilic groups of the compound in the composition.

[3] Cured Product

The invention [3] is concerned with a cured product available on blending and curing the curable composition [1] and a cured product obtainable by curing the one-component curable composition with water. The curing temperature is preferably not less than −25° C. but the curing can be effected even at low temperature. In this connection, the higher the temperature is, the higher is the cure speed. The more preferred temperature range is 0 to 100° C. and the still more preferred range is 5 to 40° C. The one-component composition undergoes curing on contact with atmospheric moisture (humidity). The humidity condition is preferably 20 to 100% R.H., more preferably 30 to 80% R.H. The cure time is several minutes to 100 hours. The cured product is excellent in physical properties such as water resistance, chemical resistance, mechanical properties and adhesion.

BEST MODE FOR CARRYING OUT THE INVENTION

The following examples illustrate the present invention in further detail without defining the scope of the invention. In these examples, all parts are by weight.

The test protocols used are as follows.

(i) Dry tack time: Glass sheets were coated with the compositions prepared according to the formulas shown in Tables 2 and 3, respectively, in a thickness of 500 μm and allowed to sit in an atmosphere of 25° C./65% R.H. or 0° C./30% R.H. and the time to disappearance of surface tackiness was measured for each composition.

(ii) Tensile strength: The compositions according to the formulations shown in Tables 2 and 3 were respectively cured by allowing to sit in an atmosphere of 25° C./65%

R.H. for 7 days and the tensile strength and elongation of the cured product at 25° C. were measured.

(iii) Crosscut test: Cold-rolled steel sheets cleaned thoroughly beforehand were coated with the compositions according to the formulations shown in Tables 2 and 3, respectively, in a thickness of 50 μm and cured by allowing to sit in an atmosphere of 25° C./65% R.H. for 7 days. The cured samples were subjected to the crosscut test according to JIS A 5400.

(iv) Water resistance: The compositions according to the formulations shown in Tables 2 and 3 were cured by allowing to sit in an atmosphere of 25° C./65% R.H. for 7 days. The resulting cured products were immersed in distilled water at room temperature for 30 days. Each product was weighed before and after immersion and the change in weight was determined.

(v) Acid resistance: The compositions according to the formulations shown in Tables 2 and 3 were cured by allowing to sit in an atmosphere of 25° C./65% R.H. for 7 days. The cured products were immersed in 5% sulfuric acid/water at room temperature for 30 days. Each cured product was weighed before and after immersion and the change in weight was determined.

(vi) Viscosity: Using samples conditioned at 25° C. or 0° C. for 2 hours, a viscosity measurement with a B-type viscometer was carried out at the same temperature. The viscosity in Production Examples 1 to 9, Examples 17 to 19 and Comparative Examples 12 to 14 were carried out at 25° C. and the measurements in Examples 1 to 16 and Comparative Examples 1 to 11 were carried out at 0° C.

Production Example 1

A reaction vessel was charged with 90 parts of carbon disulfide, 5 parts of lithium bromide and 120 parts of tetrahydrofuran (THF) and after dissolution under stirring, 58 parts of propylene oxide (PO) was added dropwise while the temperature was maintained at not more than 20° C. and then aged at 40° C. for 5 hours. After the THF and excess carbon disulfide were distilled off under reduced pressure, the residue was filtered to recover a hetero ring-containing compound (A-1) as a light-yellow liquid having a viscosity of 25 mPa·s and 135 of the hetero ring equivalent. The structure of this hetero ring-containing compound (A-1) was considered to be No. 1 in Table 1.

Production Example 2

A reaction vessel was charged with 90 parts of carbon disulfide, 5 parts of lithium chloride and 140 parts of THF and after dissolution under stirring, 140 parts of trimethylolpropane triglycidyl ether (epoxy equivalent 140) was added dropwise while the temperature was maintained at not more than 20° C. and then aged at 40° C. for 5 hours. After the THF and excess carbon disulfide were distilled off under reduced pressure, the residue was filtered to recover a hetero ring-containing compound (A-2) as a light-yellow liquid having a viscosity of 130 mPa·s and 218 of the hetero ring equivalent. The structure of this hetero ring-containing compound (A-2) was considered to be No. 2 in Table 1.

Production Example 3

A reaction vessel was charged with 90 parts of carbon disulfide, 5 parts of lithium bromide and 120 parts of THF and after dissolution under stirring, 58 parts of trimethylene oxide was added dropwise while the temperature was maintained at not more than 20° C. and then aged at 40° C. for 5 hours. After the THF and excess carbon disulfide were distilled off under reduced pressure, the residue was filtered to recover a hetero ring-containing compound (A-3) as a pale yellow liquid having a viscosity of 40 mPa·s and 140 of the hetero ring equivalent. The structure of this hetero ring-containing compound (A-3) was considered to be No. 3 in Table 1.

Production Example 4

A reaction vessel was charged with 117 parts of carbon disulfide, 219 parts of glycidyl methacrylate, 5.3 parts of lithium chloride and 120 parts of THF and after dissolution under stirring, 219 parts of glycidyl methacrylate was added dropwise while the temperature was maintained at not more than 25° C. and then aged at 40° C. for 5 hours. After the THF and excess carbon disulfide were distilled off under reduced pressure, the residue was filtered to recover a hetero ring-containing compound (A-4) as a pale yellow liquid having a viscosity of 31 mPa·s and 218 of the hetero ring equivalent. The structure of this hetero ring-containing compound (A-4) was considered to be No. 4 in Table 1.

EXAMPLES 1 TO 9

Comparative Examples 1 to 6

According to the formulations shown in Table 2, the respective components were blended and stirred, and the performance evaluation tests (i)~(vi) were carried out. The results are shown in Table 2. As the compound (B) having 2 or more electrophilic groups reactive to thiol or —S⁻ groups per molecule, the following compounds were used.

Polyepoxide (B1): bisphenol A diglycidyl ether (Yuka Shell Epoxy Co., Epikote 828; epoxy equivalent 190, viscosity 11,000 mPa·s) (B-1)

Polyisocyanate (B2): 4,4'-MDI (B-2)

Poly(acid anhydride) (B3): pyromellitic anhydride (B-3)

Polyoxazolidine (B5): the polyoxazolidine obtained by reacting 2-(1,3-oxazolidin-3-yl)-ethanol with HDI (B-5)

TABLE 2

| | | | Example | | | | | | | | | Comparative Example | | | | | |
|---|---|---|---|---|---|---|---|---|---|---|---|---|---|---|---|---|---|
| | | | 1 | 2 | 3 | 4 | 5 | 6 | 7 | 8 | 9 | 1 | 2 | 3 | 4 | 5 | 6 |
| Formu- lation (in parts) | Hetro ring compound | A-1 | 5 | 10 | 5 | | | 5 | 10 | 5 | 5 | | | | | | |
| | | A-2 | | | | 8 | | | | | | | | | | | |
| | | A-3 | | | | | 10 | | | | | | | | | | |
| | m-Xylylenediamine (C-1) | | 35 | 37 | 35 | 35 | 37 | 35 | 37 | 35 | 35 | 34 | 34 | 34 | 34 | 34 | 34 |
| | Phenol | | | | | | | | | | | | | | | 1.7 | |

TABLE 2-continued

|  |  | Example |  |  |  |  |  |  |  |  | Comparative Example |  |  |  |  |  |
|---|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 | 6 |
| Nonylphenol DMP-10 (E-1) | | | | 5 | | | | | | | | | | 3.4 | | | |
| Compound having 2 or more electrophilic groups reactive with thiol or —S⁻ | B-1 | 190 | 190 | 190 | 190 | 190 | | | | | 190 | 190 | 190 | | | |
| | B-2 | | | | | | 125 | 125 | | | | | | 125 | | |
| | B-3 | | | | | | | | 109 | | | | | | 109 | |
| | B-5 | | | | | | | | | 229 | | | | | | 229 |
| Viscosity (Pa · s) | | 52 | 45 | 55 | 60 | 48 | 180 | 160 | 172 | 165 | 62 | 60 | 68 | Solid | Solid | 180 |
| Dry tack time at 0° C. (min.) | | 120 | 45 | 15 | 25 | 75 | 100 | 60 | 210 | 190 | Tack remains | 360 | 420 | 540 | Tack remains | 540 |
| Dry tack time at 25° C. (min.) | | 25 | 10 | 3 | 5 | 15 | 20 | 15 | 65 | 45 | 150 | 50 | 90 | 100 | 150 | 110 |
| Tencile strength (kgf/cm²) | | 550 | 640 | 690 | 750 | 580 | 630 | 650 | 560 | 630 | 450 | 520 | 480 | 460 | 430 | 470 |
| Elongation (%) | | 8 | 15 | 18 | 25 | 12 | 28 | 25 | 7 | 15 | 4 | 5 | 6 | 6 | 5 | 7 |
| Closscut test | | 100/100 | 100/100 | 100/100 | 100/100 | 100/100 | 100/100 | 100/100 | 100/100 | 100/100 | 80/100 | 100/100 | 100/100 | 100/100 | 100/100 | 100/100 |
| Water resistance (wt/%) | | +0.3 | +0.2 | +0.3 | +0.2 | +0.3 | +0.3 | +0.3 | +0.3 | +0.4 | +0.5 | +0.4 | +0.5 | +0.6 | +0.6 | +0.5 |
| Acid resistance (wt/%) | | +0.9 | +0.5 | +0.6 | +0.4 | +0.7 | +0.6 | +0.5 | +0.8 | +0.6 | Degradation | +1.9 | +2.1 | +2.3 | +1.9 | +1.8 |

Production Example 5

A reaction vessel was charged with 136 parts of m-xylylenediamine and 120 parts of toluene, and 135 parts of hetero ring-containing compound (A-1) was added dropwise while the temperature was maintained at not more than 20° C., followed by aging at 40° C. for 5 hours. The toluene was then distilled off under reduced pressure to recover a reaction product (T-1) as a light-yellow liquid having a viscosity of 1,200 mPa·s and 90 of the active hydrogen equivalent.

Production Example 6

A reaction vessel was charged with 146 parts of triethylenetetramine and 120 parts of toluene, and 270 parts of hetero ring-containing compound (A-1) was added dropwise while the temperature was maintained at not more than 20° C., followed by aging at 40° C. for 5 hours. The toluene was then distilled off under reduced pressure to recover a reaction product (T-2) as a light-yellow liquid having a viscosity of 1,400 mPa·s and 95 of the active hydrogen equivalent.

EXAMPLES 10 TO 13

Comparative Example 7 to 9

According to the formulations shown in Table 3, the respective components were blended and stirred, and the performance evaluation tests (i) to (vi) were carried out. The results are shown in Table 3. In Table 3, React CA-101 (produced by Sanyo Chemical Inc.) is a Mannich-modified polyamine compound with an active hydrogen equivalent of 75 and a viscosity of 2,100 mPa·s (25° C., measured by B-type viscometer) and "Capcure 3-800" (produced by Henkel Inc.) is a polymercaptan compound with an active hydrogen equivalent of 280 and a viscosity of 1,800 mPa·s (25° C., measured by B-type viscometer)

TABLE 3

|  |  | Example |  |  |  | Comparative Example |  |  |
|---|---|---|---|---|---|---|---|---|
|  |  | 10 | 11 | 12 | 13 | 7 | 8 | 9 |
| Formulation (in parts) | compound (T-1) | 32 | 32 | | | | | |
| | compound (T-2) | | | 33 | 33 | | | |
| | React CA-101 | | | | | 28 | | |
| | Capcure 3-800 | | | | | | 60 | 43 |
| | Tris-dimethylamino-methylphenol (E-2) | | 5 | | 5 | | 5 | 5 |
| | Epikote 828 (B-1) | 68 | 68 | 67 | 67 | 72 | 40 | 57 |
| Viscosity (Pa · s) | | 102 | 115 | 105 | 110 | 142 | 150 | 128 |
| Dry tack time at 0° C. (min.) | | 60 | 20 | 50 | 30 | 340 | 45 | 40 |
| Dry tack time at 25° C. (min.) | | 10 | 4 | 8 | 2 | 35 | 10 | 3 |
| tencile strength (kgf/cm²) | | 720 | 680 | 740 | 650 | 580 | 450 | 520 |
| Elongation (%) | | 25 | 32 | 27 | 22 | 5 | 15 | 21 |
| Closscut test | | 100/100 | 100/100 | 100/100 | 100/100 | 95/100 | 90/100 | 100/100 |
| Water resistance (wt %) | | +0.3 | +0.2 | +0.2 | +0.4 | +0.4 | +2.8 | +2.2 |
| Acid resistance (wt %) | | +0.8 | +0.9 | +0.7 | +0.6 | +0.8 | +7.4 | +5.8 |

It will be apparent from the above results that the curable composition [1], the composition using the curing agent of the invention [2] and the cured product [3], all according to the present invention, feature a high-speed cure at room temperature~low temperature, a sufficiently low viscosity to insure good workability, and gives cured products having very satisfactory water resistance, chemical resistance, mechanical strength, adhesion and other physical properties.

In the following examples, one-component curable compositions of the present invention as embodied using a polyamino compound precursor (C2) as the compound (C) having 2 or more nucleophilic groups per molecule is described below, although the invention is by no means limited to those examples. It should be understood that all parts are by weight.

Production Example 7

A reactor equipped with a stirrer, heater, cooling jacket, and reflux condenser with a water trap was charged with 1000 parts of "Epikote 828", 2000 parts of toluene, 1086 parts of methacrylic acid, 20 parts of triphenylphosphine and 1.1 parts of hydroquinone and the reaction was carried out under heating at 100° C. for 6 hours, with air being bubbled through the mixture. At the end of this reaction time, the acid value had reached 101, indicating that the reaction had progressed almost 100%.

Then, 20 parts of p-toluenesulfonic acid was added and the reactor was heated to 122° C., whereupon refluxing started. With the distillation of water being monitored, the refluxing was continued for 10 hours. When the acid value had reached 29, the mixture was cooled. Then, 600 parts of 30% sodium hydroxide/$H_2O$ was added, and after stirring and, then, standing, the aqueous layer was separated. The organic layer was further washed with 2000 parts of deionized water, and after phase separation, the toluene was distilled off under reduced pressure while air was bubbled through the reaction mixture. The residue was filtered using 10 parts of diatomaceous earth (produced by Showa Chemical Inc.; Celite #600) as the filter aid to give an intermediate M-1. This intermediate M-l had a number average molecular weight of 675, a molecular weight per methacrylate group of 175, and a viscosity (25° C., measured by B-type viscometer) of 4350 mPa·s.

A reactor similar to the above was charged with 1000 parts of the intermediate M-1, 518 parts of monoethanolamine and 1.0 part of hydroquinone and the reaction was carried out at 40° C. for 8 hours while air was constantly bubbled through the mixture. It was confirmed by GC that the monoethanolamine had been consumed almost 100% relative to the methacrylate fraction. Thereafter, while nitrogen gas was bubbled through the reaction mixture, the monoethanolamine was distilled off, under the conditions of 100° C.×10 mm Hg×5 hours to give an intermediate MAA-1. This intermediate MAA-1 had a number average molecular weight of 895, a molecular weight per hydroxyethylimino group of 248 and a viscosity (25° C., measured by B-type viscometer) of 18300 mPa·s.

A reactor similar to the one used above was charged with 1000 parts of said intermediate MAA-1, 875 parts of methyl ethyl ketone and 2000 parts of toluene, and after nitrogen purging, the dehydration reaction was carried out under reflux at atmospheric pressure. The amount of water distilled being monitored, the reaction was allowed to proceed for 14 hours. Determination by GC revealed that the methyl ethyl ketone commensurate with the hydroxylimino fraction had been consumed. Then, the toluene and excess methyl ethyl ketone were distilled off under reduced pressure and the residue was filtered using 10 parts of diatomaceous earth (Showa Chemical Ind.) as the filter aid to give a hetero ring-containing compound (OXZ).

This hetero ring-containing compound (OXZ) was a yellow-brown liquid and had a number average molecular weight of 1090, amolecular weight per hetero ring of 305 and a viscosity (25° C., measured by B-type viscometer) of 7600 mPa·s.

Production Example 8

A reactor equipped with a stirrer, heater, cooling jacket, and reflux condenser with a water trap was charged with 1000 parts of ethylenediamine, 2000 parts of methyl ethyl ketone and 2000 parts of toluene, and after nitrogen purging, the dehydration reaction was carried out under reflux at 120 to 130° C. for 12 hours.

The by-product water formed with the progress of reaction was sequentially removed to facilitate progress of the reaction. After completion of the reaction, the excess methyl ethyl ketone was distilled off under reduced pressure to recover a ketimine compound KTN.

This ketimine compound KTN was a yellowish brown liquid and had a molecular weight per ketimine group of 84 and a viscosity of 210 mPa·s.

Production Example 9

A reactor equipped with a stirrer, heater and cooling jacket was charged with 134 parts of trimethylolpropane, 654 parts of 4,4'-MDI and 8.0 parts of dibutyltin dilaurate, and the reaction was carried out in a nitrogen stream at 80° C. for 5 hours. Determination of the obtained isocyanate content revealed that not less than 99% of trimethylolpropane had been consumed. The reaction mixture was then cooled. The polyisocyanate (PIC) thus obtained was a light-yellow clear liquid and had a molecular weight per isocyanate group of 263 and a viscosity of 1990 mPa·s.

EXAMPLES 14 TO 16

Comparative Examples 10 and 11

Using the oxazolidine, ketimine and polyisocyanate, compositions were prepared according to the formulations shown in Table 4 and evaluated for the following parameters. As the polyepoxide, Epikote 828 (Yuka Shell Epoxy) was used. (i) Storage stability (shelf-life): Each of the compositions shown in Table 4 was placed in a closed vessel subjected to nitrogen purging in advance, and allowed to stand in an atmosphere of 25° C. for 6 months. Each composition was observed and rated ○ when it remained fluid or X when it had formed gels.

The tack life, tensile strength, crosscut test, water resistance and acid resistance were evaluated in the same manner as in Examples 1 to 13.

TABLE 4

|  |  | Example | | | Comparative Ex. | |
| --- | --- | --- | --- | --- | --- | --- |
|  |  | 14 | 15 | 16 | 10 | 11 |
| Formulation (in parts) | Hetro ring compound (OXZ) | 280 |  |  |  |  |
|  | Ketimine compound (KTN) |  | 75 |  | 84 | 84 |
|  | Polyisocyanate (PIC) |  |  | 250 |  |  |
|  | Hetro ring compound (A-1) | 15 | 12 | 15 |  |  |
|  | Phenol |  |  |  |  | 4 |
|  | Epikote 828 (B-1) | 190 | 190 | 190 | 190 | 190 |
| Viscosity (Pa · s) |  | 55 | 65 | 26 | 85 | 80 |
| Storage stability |  | ○ | ○ | ○ | ○ | ○ |
| Dry tack time at 0° C. (min.) |  | 650 | 810 | 1100 | Tack remains | 2400 |
| Dry tack time at 25° C. (min.) |  | 200 | 250 | 340 | 600 | 420 |
| Tencile strength (kgf/cm²) |  | 510 | 590 | 550 | 210 | 450 |
| Elongation (%) |  | 25 | 32 | 27 | 45 | 15 |
| Closscut test |  | 100/100 | 100/100 | 100/100 | 95/100 | 90/100 |
| Water resistance (wt %) |  | +0.3 | +0.2 | +0.2 | +2.4 | +1.8 |
| Acid resistance (wt %) |  | +0.8 | +0.9 | +0.7 | Degraded by elution | +5.4 |

The one-component resin compositions of the invention as described in Examples 14 to 16 invariably showed good storage stability and fast curing speeds as compared with the one-component resin compositions including the ketimine compound alone as the curing agent (Comparative Examples 10 and 11).

EXAMPLES 17 TO 19

Comparative Examples 12 to 14

The compositions according to the formulations shown in Table 5 were evaluated for the following parameters.

(i) Viscosity: The components shown in Table 5 were blended and dissolved and the viscosity of each composition was measured at 25° C. using a B-type viscometer.

(ii) Glass transition temperature: Each of the compositions shown in Table 5 was blended, dissolved and coated, in a thickness of 20 μm, on a glass sheet precoated with a release agent and cured with drying under the conditions of 80° C.×3 hours, 120° C.×3 hours and 150° C.×5 hours. The resulting film was peeled off and the Tg was determined by dynamic viscoelasticity measurement (oscillation frequency 6.28 rad/sec., temperature increasing rate 5° C./min.).

(iii) Water absorption rate: Using samples prepared in the same manner as in (ii) above, the percent weight change was determined after treatment under the following two conditions in accordance with JIS 7114.

Treating conditions: immersion in water at 23° C. for 7 days or in boiling water for 30 minutes.

(iv) Electrical characteristics: Using samples prepared as in (ii) above, the dielectric constant (1 MHz), dielectric loss (1 MHz), surface resistivity and volume resistivity were measured in accordance with JIS C 6481.

(v) Peel strength: Cured resin plates prepared in a thickness of 5 mm in the same manner as in (ii) were roughened by dipping in 500 g/L chromic acid/H$_2$O at 70° C. for 15 minutes, and after neutralization and washing, a palladium catalyst was deposited. The plates were immersed in the following electroless plating bath for 11 hours to apply an electroless copper plating film having a thickness of 25 μm. Using the samples, the peel strength was measured in accordance with JIS C 6481.

| Electroless plating bath composition | |
| --- | --- |
| Copper (CuSO$_4$ · 5H$_2$O) | 0.06 mole/L |
| Formalin | 0.30 mole/L |
| Sodium hydroxide | 0.35 mole/L |
| EDTA (ethylenediaminetetracetic acid) | 0.12 mole/L |
| Additive | q.s. |
| Plating bath temperature | 70° C. |
| Plating bath pH | 12.4 |

(vi) Dynamic characteristics: Using samples prepared as in (ii), the break strength, break distance and elastic modulus were measured in accordance with JIS K 7127.

(Vii) Erichsen: Testpieces were prepared using steel sheets in otherwise the same manner as in (ii) and the Erichsen value was determined with the steel sheet carrying the film in accordance with JIS A 5400.

TABLE 5

|  |  | Example | | | Comparative Ex. | | |
| --- | --- | --- | --- | --- | --- | --- | --- |
|  |  | 17 | 18 | 19 | 12 | 13 | 14 |
| Formulation (in parts) | Phenol novolac |  |  |  | 337 |  |  |
|  | Diethyltolylenediamine (C-1) | 182 | 175 | 175 |  | 180 | 180 |
|  | Polyether sulfone (G) |  |  | 250 |  |  | 400 |
|  | n-methylpyrrolidone |  |  |  |  |  | 435 |
|  | t-butyl peroxybenzoate | 14.7 | 14.1 | 14.1 |  |  |  |
|  | Hetro ring compound (A-4) | 293 | 281 | 281 |  |  |  |

TABLE 5-continued

|  |  | Example | | | Comparative Ex. | | |
| --- | --- | --- | --- | --- | --- | --- | --- |
|  |  | 17 | 18 | 19 | 12 | 13 | 14 |
|  | Sumi-Epoxy ESCN 220-L |  | 530 | 530 | 662 | 820 | 820 |
|  | Epikote 828 (B-1) | 510 |  |  |  |  |  |
| Results of | Viscosity after mixing (Pa · s) | 0.12 | 0.34 | 0.84 | Solid | Solid | 0.79 |
| Evaluation | Glass transition point (° C.) | 172 | 184 | 204 | 168 | 175 | 189 |
|  | Water 23° C. × 7 Days | 0.09 | 0.10 | 0.07 | 0.21 | 0.27 | 0.17 |
|  | absorption Boiling water × 30 min. | 0.17 | 0.17 | 0.10 | 0.42 | 0.55 | 0.33 |
|  | (%) |  |  |  |  |  |  |
|  | Electrical Dielectric constant | 2.9 | 2.9 | 3.2 | 3.6 | 3.5 | 3.6 |
|  | characteristics Dielectric loss | 0.02 | 0.02 | 0.02 | 0.03 | 0.03 | 0.04 |
|  | Surface resistance (Ω cm) | $7.1 \times 10^{13}$ | $7.0 \times 10^{13}$ | $8.1 \times 10^{13}$ | $2.6 \times 10^{13}$ | $2.1 \times 10^{13}$ | $2.4 \times 10^{13}$ |
|  | Volume resistance (Ω cm) | $4.7 \times 10^{16}$ | $4.1 \times 10^{15}$ | $4.5 \times 10^{14}$ | $2.0 \times 10^{15}$ | $2.1 \times 10^{16}$ | $2.1 \times 10^{16}$ |
|  | Peel strength (Kgf/cm) | 1.8 | 1.9 | 1.7 | 0.9 | 0.8 | 1.0 |
|  | Dynamic Break strength (MPa) | 562 | 601 | 722 | 485 | 512 | 560 |
|  | characteristics Elongation at break (%) | 5.3 | 4.4 | 11.3 | 2.3 | 2.0 | 2.9 |
|  | Elastic modulus (GPa) | 3.6 | 4.1 | 4.3 | 2.5 | 2.4 | 2.6 |
|  | Erichsen (mm) | 2.4 | 2.4 | 8.6 | 1.4 | 1.1 | 3.1 |

The curable composition [1], curing agent [2] and cured product [3] according to the present invention have the following useful characteristics.

(1) High-speed curability at room temperature: rapid cure even at −20° C. to 5° C.
(2) Excellent physical properties, e.g. water resistance, chemical resistance, mechanical strength and adhesion, of the cured product.
(3) Low-viscosity, low-smelling, free from health-hazardous components such as environmental hormones, e.g. phenol, nonylphenol, bisphenol A, etc., and low in dermal irritation potential, with consequent good workability.

INDUSTRIAL APPLICABILITY

Having the above useful characteristics, the curable composition [1], curing agent [2] and cured product [3] of the present invention find application in such fields as (i) paints and coatings such as heavy-duty corrosion proof paints, corrosion proof coatings, coatings for coated floors, paints for exterior finishing, automotive (electrodeposition) paints, powder coatings and primers, etc.; (ii) adhesives such as structural adhesives, elastic adhesives, solvent type reactive adhesives, self-adhesives, pressure-sensitive adhesives, etc., (iii) sealing agents, (iv) concrete repair filling materials, (v) matrix resins for fiber-reinforced and other laminates, (vi) electronic materials such as cast insulation, semiconductor sealants, inter-level insulation materials, etching resist materials, plating resist materials, solder resist materials, etc.; (vii) repair putty, and (vii) resins for impregnation, potting or molding.

What is claimed is:

1. A curable composition which comprises a hereto ring-containing compound (A1) of the following general formula (2) or (3), a compound (B) having 2 or more electrophilic groups reactive to thiol or —S— groups per molecule, and a compound (C) having 2 or more nucleophilic groups per molecule:

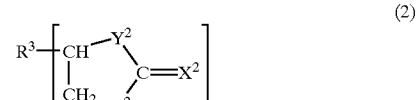

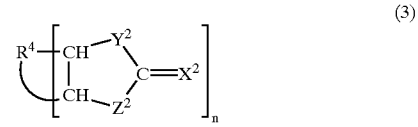

in the formulas (2) and (3), n represents an integer of 1 to 10; $X^2$ represents a sulfur atom; one of $Y^2$ and $Z^2$ represents a sulfur atom, and the other represents an oxygen atom; in formula (2) $R^3$ represents the residue of a polyepoxide (B1) or monoepoxide (d11);
in the formula (3), $R^4$ represents the residue of an alicyclic epoxide (D11-5),
wherein the ratio of the nucleophilic group in (C) to the electrophilic group in (B) is 0.7 to 1.3.

2. The curable composition according to claim 1 wherein the compound (C) having 2 or more nucleophilic groups per molecule is at least one member selected from the group consisting of a polyamino compound (C1), a precursor thereof (C2), a polyol (F) and a polythiol (C3).

3. The curable composition according to claim 1 wherein each of said electrophilic groups in (B) is at least one kind of group selected from the group consisting of epoxy group, isocyanato group, acid anhydride group, acid halide group, oxazoline group, cyclic carbonate group, unsaturated carboxylic acid group and allyl group.

4. The curable composition according to claim 1 wherein said (B) is at least one compound selected from the group consisting of a polyepoxide (B1), a polyisocyanate (B2), a poly(acid anhydride) (B3), a poly(acid halide) (B4), a polyoxazoline (B5), a poly(cyclic carbonate) (B6), an unsaturated carboxylic polyester (B7) and a polyallyl compound (B8).

5. The curable composition according to claim 4 wherein said (B1) is at least one member selected from the group consisting of a glycidyl ether, a glycidyl ester, a glycidylamine, a chain aliphatic epoxide, and an alicyclic epoxide.

6. The curable composition according to claim 2 which comprises at least one member selected from the group consisting of a basic compound (E), a thermoplastic resin (G), a deodorizer (H), an adhesion improving agent, an antioxidant, an ultraviolet absorber, a stabilizer, a plasticizer, a wax, a non-reactive diluent, a filler, a pigment, a dye, a solvent, a foaming agent, a dehydrating agent, an antistatic agent, an antibacterial agent, an antifungal agent, a viscosity control agent, a perfume, a flame retardant, a leveling agent, a dispersant and a catalyst.

7. The curable composition according to claim 1 wherein said (A) has a viscosity of not more than 1000 mPa·s at 25° C.

8. The curable composition according to claim 2 wherein said (C) is a polyamino compound (C1) or a precursor thereof (C2).

9. The curable composition according to claim 8 which is a one-component curable composition, said (C) being a polyamino compound precursor (C2) and reacting with water to give a primary or secondary amine.

10. The curable composition according to claim 9 wherein said (C2) is the dehydrative condensation product of a primary or secondary amine with a carbonyl compound.

11. The curable composition according to claim 9 wherein said (C2) is a hetero ring-containing compound (C21) having at least 2 heterocyclic groups of the following general formula (4) per molecule;

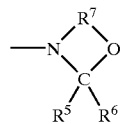

(4)

wherein $R^5$ and $R^6$ each independently represents a hydrogen atom, a straight-chain or branched-chain alkyl or alkenyl group of 1 to 6 carbon atoms or an aryl or aralkyl group of 6 to 10 carbon atoms; $R^5$ and $R^6$ may jointly form a cycloalkyl group of 5 to 7 carbon atoms; $R^7$ represents an alkylene group of 1 to 10 carbon atoms.

12. The curable composition according to claim 11 wherein said compound (C21) is represented by the following general formula (5);

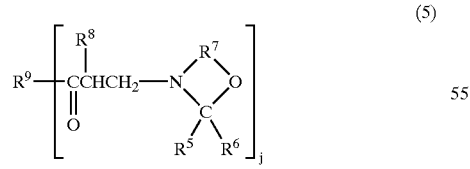

(5)

wherein j represents an integer of 2 to 10; $R^5$, $R^6$ and $R^7$ are as defined for the general formula (4); $R^8$ represents a hydrogen atom or a methyl group; $R^9$ represents the residue of a polyamino compound (C1) or a polyol compound (F).

13. The curable composition according to claim 9 wherein said compound (C2) is a ketimine compound (C22) of the following general formula (6):

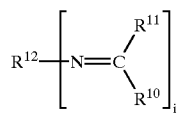

(6)

wherein i represents an integer of 2 to 10; $R^{10}$ and $R^{11}$ each independently represents a hydrogen atom, a straight-chain or branched-chain alkyl or alkenyl group of 1 to 6 carbon atoms, or an aryl or aralkyl group of 6 to 8 carbon atoms; $R^{10}$ and $R^{11}$ may jointly form a cycloalkyl group of 5 to 7 carbon atoms; $R^{12}$ represents the residue of a polyamino compound (C1).

14. The curable composition according to claim 1 wherein said (A) reacts with said (C) in advance.

15. The curable composition according to claim 1 which contains said (A) and (C) in the form of the reaction product (T1) of (A) and (C).

16. The curable composition according to claim 1 which comprises at least one member selected from the group consisting of a basic compound (E), a thermoplastic resin (G), a deodorizer (H), an adhesion improving agent, an antioxidant, an ultraviolet absorber, a stabilizer, a plasticizer, a wax, a non-reactive diluent, a filler, a pigment, a dye, a solvent, a foaming agent, a dehydrating agent, an antistatic agent, an antibacterial agent, an antifungal agent, a viscosity control agent, a perfume, a flame retardant, a leveling agent, a dispersant and a catalyst.

17. A cured product as obtainable on curing of the curable composition according to claim 1.

18. A resin for a paint or coating, an adhesive, a sealing agent, a concrete repair filling agent, a matrix resin for laminates, an electronic material, repair putty, or impregnation, potting, or molding application, which comprises the curable composition according to claim 1.

19. A method for curing a compound (B) having 2 or more electrophilic groups reactive to thiol or —S— groups per molecule, comprising mixing said compound (B) with a reaction product (T1) of a hetero ring-containing compound (A1) of the following general formula (2) or (3) with a compound (C) having 2 or more nucleophilic groups per molecule:

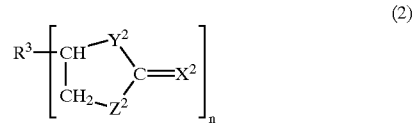

(2)

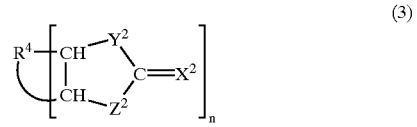

(3)

in the formulas (2) and (3), n represents an integer of 1 to 10; $X^2$ represents a sulfur atom; one of $Y^2$ and $Z^2$ represents a sulfur atom, and the other represents an oxygen atom; in formula (2) $R^3$ represents the residue of a polyepoxide (B1) or monepoxide (d11); in the formula (3), $R^4$ represents the residue of an alicyclic epoxide (D11-5), wherein the ratio of the nucleophilic group in (C) to the electrophilic group in (B) is 0.7 to 1.3.

* * * * *